United States Patent [19]

Yoshida et al.

[11] Patent Number: 5,239,576
[45] Date of Patent: Aug. 24, 1993

[54] COMMUNICATION APPARATUS

[75] Inventors: Takehiro Yoshida, Tokyo; Makoto Kobayashi, Tama; Shinnichiro Otsuki; Takeshi Ono, both of Kawasaki; Tomoyuki Takeda, Yokohama; Masaya Kondo, Tokyo, all of Japan

[73] Assignee: Canon Kabushiki Kaisha, Tokyo, Japan

[21] Appl. No.: 761,645

[22] Filed: Sep. 18, 1991

[30] Foreign Application Priority Data

Sep. 28, 1990 [JP] Japan ................... 2-259951
Sep. 28, 1990 [JP] Japan ................... 2-262442
Mar. 4, 1991 [JP] Japan ................... 3-037414

[51] Int. Cl.$^5$ ........................................ H04M 11/00
[52] U.S. Cl. .................... 379/355; 379/354; 379/100; 358/440
[58] Field of Search ............... 379/354, 355, 356, 216, 379/100, 93, 95, 96; 358/440

[56] References Cited

U.S. PATENT DOCUMENTS

| | | | |
|---|---|---|---|
| 4,659,876 | 4/1987 | Sullivan et al. | 379/355 X |
| 4,782,512 | 11/1988 | Hutton | 379/355 X |
| 4,825,461 | 4/1989 | Kurita et al. | 379/93 |
| 4,833,705 | 5/1989 | Kobayashi | 379/93 |
| 4,864,602 | 9/1989 | Yamamoto et al. | 379/355 X |
| 4,910,506 | 3/1990 | Yoshida et al. | 340/825.07 |
| 4,910,766 | 3/1990 | Ogino et al. | 379/355 |
| 4,916,732 | 4/1990 | Kotani et al. | 358/440 |
| 4,964,159 | 10/1990 | Son | 379/355 |

*Primary Examiner*—James L. Dwyer
*Assistant Examiner*—M. Shehata
*Attorney, Agent, or Firm*—Fitzpatrick, Cella, Harper & Scinto

[57] ABSTRACT

Communication equipment in which first and second telephone number data is registered by a single selection key and first and second telephone number data is selected and dialed according to selection key input includes a data communication device and a conversation communication device. A first detector detects the hook state of the conversation communication device and a second detector detects the presence or absence of data. In response to the selection key input to dial the selected telephone number, a controller selects either the first or the second telephone number data according to the operation of the first and second detectors.

10 Claims, 16 Drawing Sheets

FIG. 5

| | TELEPHONE NUMBER (MAX. 32 DIGITS) | ADDRESS (MAX 16 DIGITS) | ATTRIBUTE |
|---|---|---|---|
| NO.00 | 0:03 3117 1234 | ○○○○FAX24dir | 000001 |
| NO.01 | 0:044 100 6419 | Ichiro Kumano | 000001 |
| NO.02 | | | |
| NO.03 | | | |
| NO.04 | | | |
| ⋮ | ⋮ | ⋮ | ⋮ |
| NO.98 | | | |
| NO.99 | | | |

FIG. 6

| BIT STATE | | ATTRIBUTE CLASSIFICATION |
|---|---|---|
| bit-1 | bit-0 | |
| 0 | 0 | NOT REGISTERED (NOT USED) |
| 0 | 1 | PHONE NUMBER |
| 1 | 0 | FOR FACSIMILE |
| 1 | 1 | COMMON |

FIG. 7

| OLD \ NEW | FOR TEL. | FOR FAX. | FOR COMMON | REGISTRATION (CHANGE) FOR TEL. | REGISTRATION (CHANGE) FOR FAX. | REGISTRATION (CHANGE) FOR COMMON |
|---|---|---|---|---|---|---|
| NOT REGISTERED | NOT REGISTERED | NOT REGISTERED | NOT REGISTERED | a) NEW REGISTRATION (SAME AS CONVENTIONAL METHOD) | a) NEW REGISTRATION (SAME AS CONVENTIONAL METHOD) | a) NEW REGISTRATION (SAME AS CONVENTIONAL METHOD) |
| REGISTERED | REGISTERED | NOT REGISTERED | (NOT REGISTERABLE) | b) REGISTRATION CHANGE (SAME AS CONVENTIONAL METHOD) | c) REFERENCE REGISTRATION (1) | d) REFERENCE REGISTRATION (2) |
| NOT REGISTERED | NOT REGISTERED | REGISTERED | (NOT REGISTERABLE) | c) REFERENCE REGISTRATION (1) | b) REGISTRATION CHANGE (SAME AS CONVENTIONAL METHOD) | d) REFERENCE REGISTRATION (2) |
| REGISTERED | REGISTERED | REGISTERED | (NOT REGISTERABLE) | b) REGISTRATION CHANGE (SAME AS CONVENTIONAL METHOD) | b) REGISTRATION CHANGE (SAME AS CONVENTIONAL METHOD) | e) REFERENCE REGISTRATION (3) |
| (NOT REGISTERABLE) | (NOT REGISTERABLE) | (NOT REGISTERABLE) | REGISTERED | f) REFERENCE REGISTRATION (4) | f) REFERENCE REGISTRATION (4) | b) REGISTRATION CHANGE |

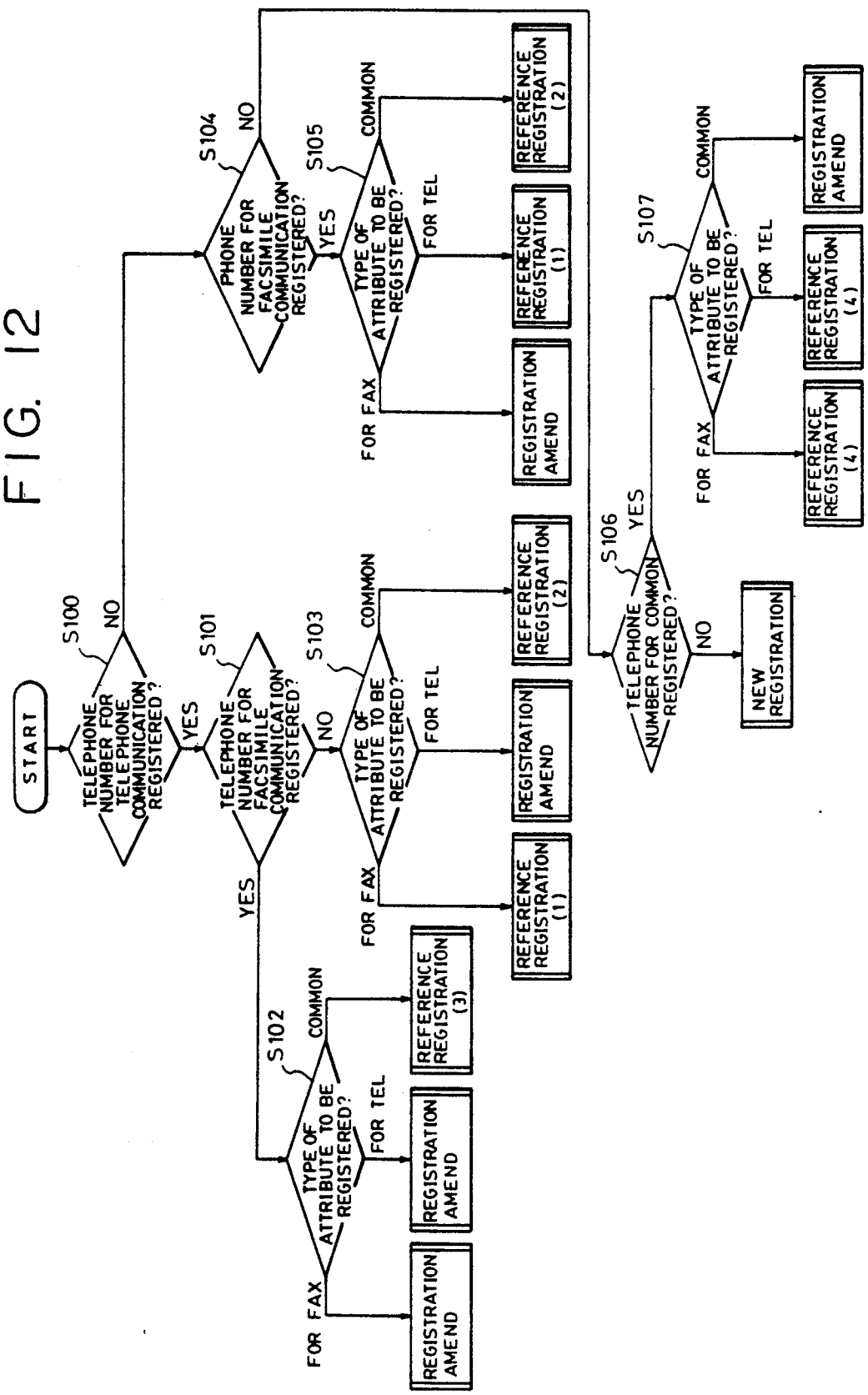

COMMUNICATION APPARATUS

BACKGROUND OF THE INVENTION

1. Field of the Invention

The present invention relates to communication apparatus, and more particularly, to communication apparatus having an abbreviated dialing function, such as a one-touch dialing key.

2. Description of the Related Art

Facsimile machines having an abbreviated dialing function are known. In one type of such facsimile machine, the user registers telephone numbers for both facsimile and telephonic transmission with a single one touch dialing key. If originals are present in the reading portion of the communication machine when the one touch dialing key is depressed, the communication machine dials the telephone number for facsimile transmission. If there are no originals in the reading portion, the telephone number for telephonic communication is dialed by the communication apparatus. Such a facsimile apparatus is disclosed in, for example, U.S. Pat. Nos. 4,825,461 and 4,833,705.

However, in the aforementioned type of facsimile apparatus, either the selection signal for facsimile transmission or that for telephonic communication is automatically selected on the basis of the presence or absence of the originals. Therefore, when the user desires to perform polling reception by transmitting the selection signal for facsimile transmission, the selection signal for facsimile transmission cannot be selected, because there is no originals to be transmitted in the reading portion. This precludes the user from performing polling reception using the automatic dialing function.

In the aforementioned type of facsimile machine in which either the telephone number for facsimile transmission or that for talk is selected on the basis of the presence or absence of originals, the two telephone numbers are used only for facsimile transmission and telephone communication respectively, and cannot be utilized more effectively.

SUMMARY OF THE INVENTION

An object of the present invention is to provide an improved communication apparatus capable of overcoming the aforementioned problems of the conventional ones.

Another object of the present invention is to provide a communication apparatus in which at least two telephone numbers, one for telephone and the other for data communication, can be registered in an abbreviated dialing key, such as a one-touch dialing key, and which allows either the telephone number for telephone communication or the telephone number for data communication to be adequately selected.

Still another object of the present invention is to provide communication apparatus in which at least two telephone numbers can be registered in a single abbreviated dialing key and which allows the abbreviated dialing key to be used for various applications other than for telephone and data communication.

The present invention is directed to communication with automatic dialing in which data is assigned to a telephone number representing data communication use, conversation communication use or both data and conversation communication use. Dialing is performed according to the data assigned to the telephone number.

The present invention provides communication apparatus in which the state of a d.c. loop of a line and the presence of data for data communication are detected when an abbreviated dialing key is depressed and in which either the telephone number for a telephone call or the telephone number for data communication is selected and dialed in accordance with the results of the detections.

The present invention further provides a communication apparatus in which first data indicating that a telephone number is for a telephone call, second data indicating that a telephone number is for data communication, and third data indicating that a telephone number is for telephone and for data communication are stored together with a telephone number in an abbreviated dialing key or the like and in which a telephone number to be dialed is selected in accordance with the first, second or third data. The present invention further provides communication apparatus in which a plurality of telephone numbers are registered in a single abbreviated dialing key and in which one of the plurality of telephone numbers is selected and dialed in accordance with a time at which that abbreviated dialing key is operated. Other objects and advantages of the invention will become apparent during the following discussion of the accompanying drawings.

BRIEF DESCRIPTION OF THE DRAWINGS

FIG. 5 shows an example of the format of a telephone number memory;

FIG. 6 shows the attribute data on a telephone number;

FIG. 7 shows various registration operations conducted according to a combination of the attributes of the telephone number data;

FIGS. 9 to 14 are flowcharts showing the control operation of the second embodiment;

DETAILED DESCRIPTION OF THE PREFERRED EMBODIMENTS

Embodiments of the present invention will be described below with reference to the accompanying drawings.

In the following embodiments, a facsimile machine with a built-in telephone set or that connected to a telephone set will be described as the communication apparatus.

First, a first embodiment will be described. In this embodiment, the user registers the telephone numbers for both talk and facsimile in an abbreviated dialing key, such as the one-touch dialing key. When the abbreviated dialing key is depressed, the facsimile machine detects the state of a d.c. loop of the circuit as well as the presence or absence of the originals for facsimile communication, and selects either the telephone number for talk or that for facsimile on the basis of the results of the detections.

Figure 1:
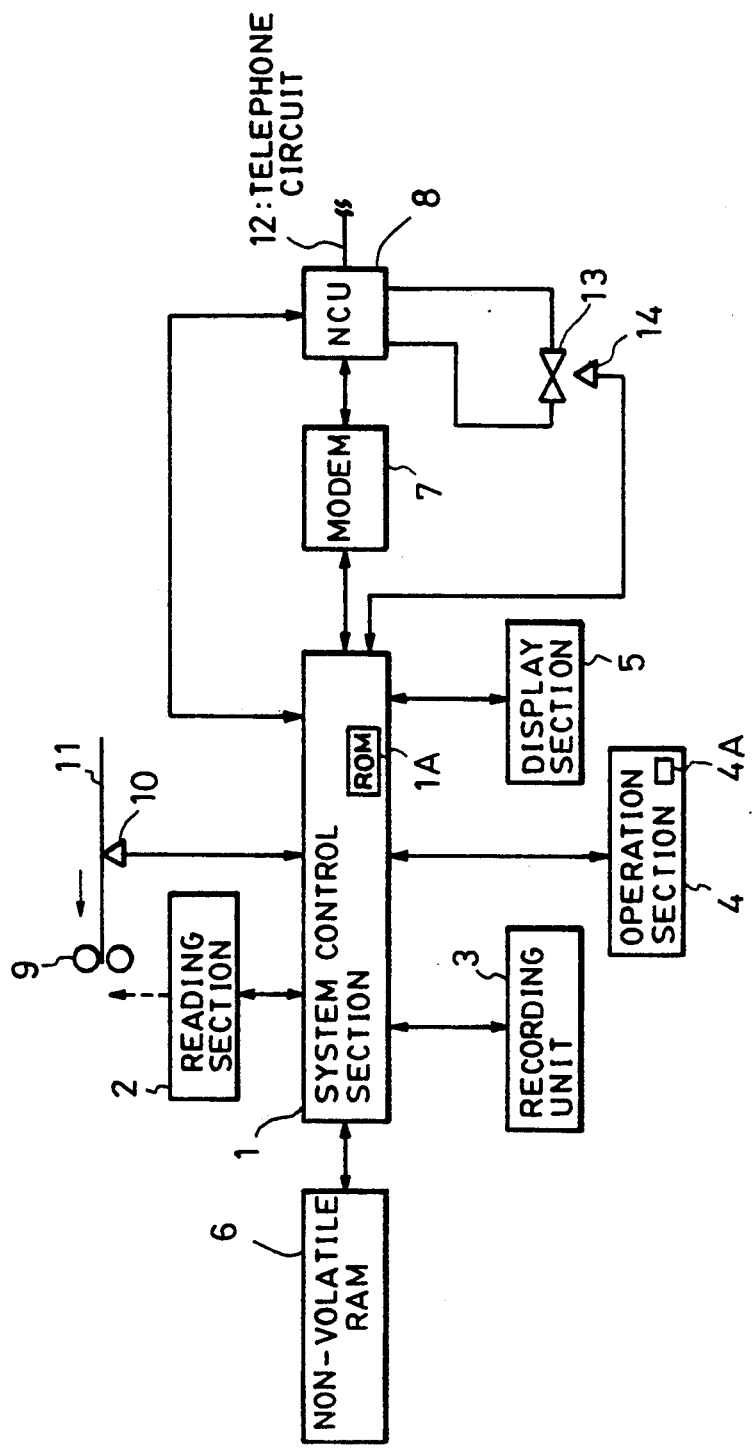
FIG. 1 is a block diagram of a first embodiment of a facsimile apparatus according to the present invention.

FIG. 1 is a block diagram of the first embodiment of the facsimile machine according to the present invention.

Figure 2:
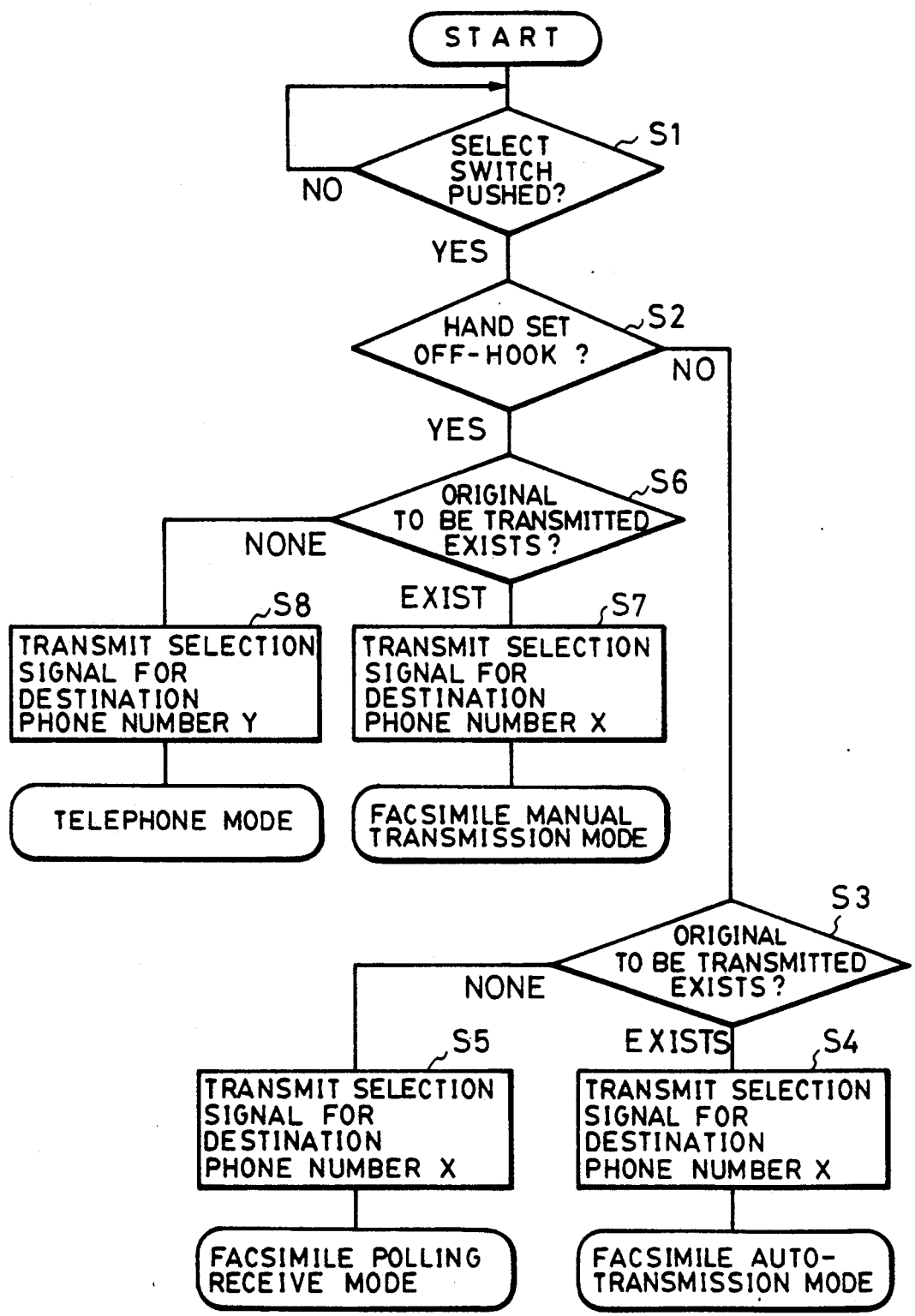
FIG. 2 is a flowchart showing the control operation of the first embodiment of FIG. 1.

In the configuration shown in FIG. 1, a system control section 1 may include a microcomputer or a storage circuit. The system control section 1 contains a ROM 1A in which a control program required to execute the control procedures shown in FIG. 2 is stored.

A reading section 2 may be a CCD image sensor which reads an original to be transmitted 11 conveyed by original document conveying rollers 9.

The original document to be transmitted 11 is detected by an original document detecting sensor 10 at predetermined time intervals as will be described layer.

A recording unit 3 electrostatically records the image representative of an image signal received on a sheet of recording paper.

An operation section 4 contains various types of operation keys, including a selection switch 4A (an abbreviated dialing key, such as a one-touch dialing key) used to execute the function of this embodiment.

A display section 5 performs status or alarm displays. The operation section 4 and the display section 5 may be a single operation/display section.

A RAM 6 comprises a non-volatile RAM in which destination telephone numbers are registered. The RAM 6 may also be a volatile memory which can be backed up with temporary battery-power supplies.

A modulator-demodulator (MODEM) 7 performs modulation and demodulation of transmission and reception signals.

A network control device (NCU) 8 (dialer circuit) sends out a selection signal (a pulse dial or tone dial signal). The network control device 8 also performs an automatic reception operation which begins with detection of a call signal (ci signal) from the telephone circuit and the circuit control operation, and sends out the selection signal to the telephone circuit 12 under the control of the system control section 1.

A handset 13 is used for talk. An off-hook detection sensor 14 detects an off-hook state of the handset 13 by detecting the d.c. loop of the telephone circuit.

FIG. 2 is a flowchart showing the operation of the first embodiment.

In the non-volatile RAM 6, both the destination telephone number "X" for facsimile and the destination telephone number "Y" for talk are stored beforehand in accordance with the selection switch 4A of the operation section 4.

First, it is determined (S1) whether or not the selection switch 4A arranged in the operation section 4 is depressed. If the selection switch 4A is depressed, the system control section 1 determines off or on-hook of the handset 13 in accordance with the output of the off-hook detection sensor 14 (S2). In a practical operation, when the d.c. loop of the telephone circuit is formed, the system control section 1 determines that the handset 13 is off hook. When the d.c. loop is not formed, on-hook is detected. Next, the system control section 1 determines whether or not original documents 11 to be transmitted are present in accordance with the output of the original document detection sensor 10 (S3).

If it is determined that original documents to be transmitted are present, the destination telephone number "X" for facsimile is read out from the non-volatile RAM 6, and the d.c. loop of the circuit is formed to establish the circuit. After the selection signal representative of the read out telephone number is sent out from the NCU 8 to the telephone circuit 12 to obtain a connection to the destination, the facsimile transmission mode is achieved, and a predetermined transmission operation is conducted (S4).

If it is determined in step 3 that there is no original in S3, the destination telephone number "X" for facsimile is read out from the non-volatile RAM 6, and the d.c. loop of the circuit is formed to establish the circuit. After the selection signal representative of that telephone number is sent out from the NCU 8 to the telephone circuit 12 to obtain a connection to the destination, the operation mode of the facsimile machine is switched over to the facsimile polling receiving mode and the receiving operation is conducted (S5).

If the hook detection sensor 14 determines that the handset 13 is off hook, the system control section 1 determines whether or not the original document 11 to be transmitted is present in accordance with the output of the original document detection sensor 10 (S6).

If it is determined that there is an original document to be transmitted, the destination telephone number "X" for facsimile is read out from the non-volatile RAM 6, and the selection signal representative of that telephone number is sent out from the NCU 8 to the telephone circuit 12. After the connection to the destination is made, the operation mode of the facsimile machine is changed over to the facsimile manual transmission mode and a predetermined transmission operation is conducted (S7).

If it is determined in S6 that there is no original document, the destination telephone number "Y" for talk is read out from the non-volatile RAM 6 and the selection signal representative of that telephone number is sent out from the NCU 8 to the telephone circuit 12. Thereafter, the operation mode is changed over to the normal telephone mode (S8).

In this embodiment, selection of the selection signal is made in accordance with the presence or absence of original documents and the hook state of the handset. It is therefore possible to make a selection of the facsimile polling receiving mode or the facsimile manual transmission mode using the auto dialing function.

In the flowchart shown in FIG. 2, detection of off-hook of the handset, conducted in the process of S2, and detection of presence of the original documents, conducted in the processes of S3 and S6, may be exchanged with each other.

Furthermore, in the flowchart of FIG. 2, the facsimile manual transmission mode achieved in the process of S7 may be the facsimile telephone mode.

A second embodiment of the present invention will now be described. In this embodiment, first, second or third data is assigned to each of the telephone numbers used for automatic dialing. The first data represents that the telephone number can be used for talk. The second data indicates that the telephone number can be used for data communication. The telephone number with the third data can be used for both talk and data communication. Dialing made in accordance with any of these data items will be described in detail.

Figure 3:
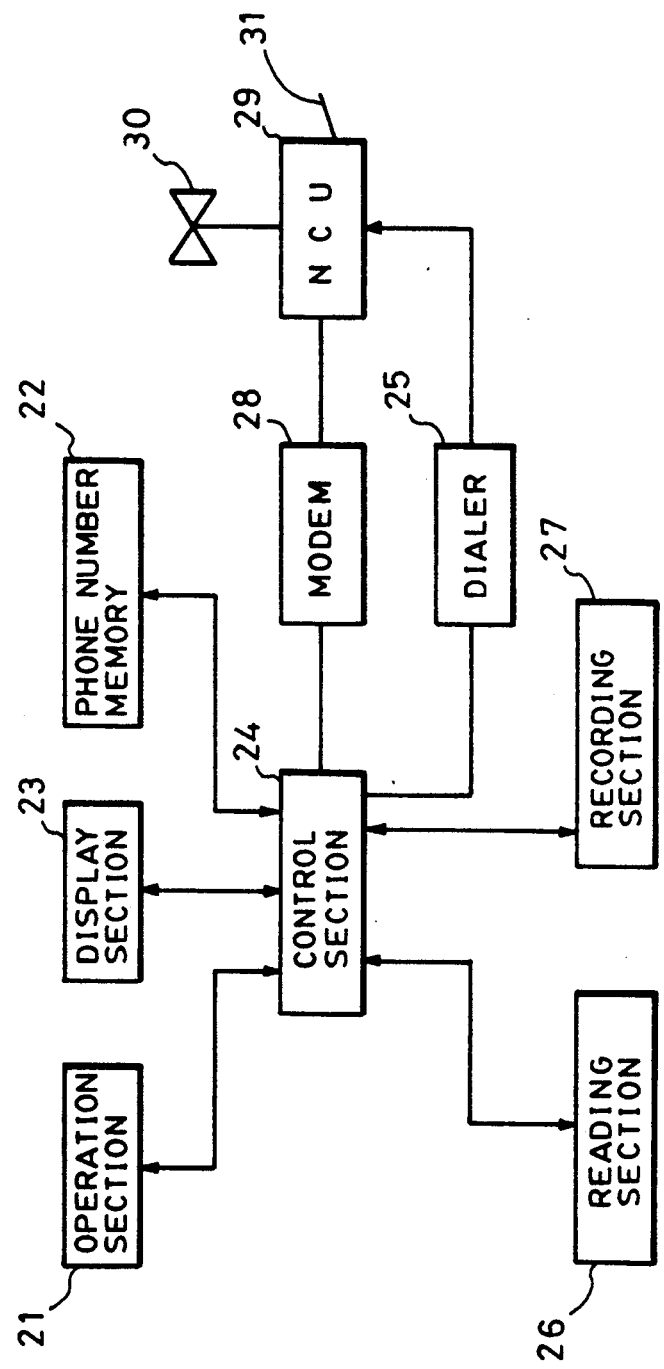
FIG. 3 is a block diagram of a second embodiment of the facsimile apparatus according to the present invention.

FIG. 3 is a block diagram of the second embodiment of a facsimile apparatus with a built-in dialing device (dialing device).

In the configuration shown in FIG. 3, an operation section 21 is made up of a plurality of key input switches for inputting various types of data and instructions, such as telephone numbers and dialing instructions. A telephone number memory 22 stores the telephone number data for an electronic telephone directory, registered through the operation section 21. Part of the memory area in the memory 22 stores a plurality of telephone number data for which dialing has already been made.

A display section 23 displays various types of data, such as telephone numbers for which dialing is to be made or has already been made. The display section 23 may be a liquid crystal display (LCD).

A control section 24 performs control over the entire facsimile apparatus as well as retrieval and dialing (calling) of the telephone numbers listed in the electronic telephone directory stored in the memory 22. The control section 24 may include a microcomputer and peripheral devices of the microcomputer, such as a control program memory (ROM), and a temporary storage memory (RAM).

A dialer (a dialing device) 25 sends out a dialing signal (a pulse or tone dialing signal) representing the telephone number data output from the control section 24 to a line 31.

A reading section 26 reads original documents. The reading section 26 may be a reader. A recording section 27 records image signals. The recording section 27 may be a thermal printer.

A modulator-demodulator (MODEM) 28 modulates coded image signals and the control signals for the facsimile communication procedures, output from the control section 24, and demodulates the control signals and image signals received from the line 31. A network control device (NCU) 29 switches over connection of the line 31 between the MODEM and a telephone set 30 (handset).

The present embodiment is centered on the dialing structure of the thus-arranged facsimile apparatus. Therefore, dialing made in this embodiment will be described below. The present invention can be applied not only to facsimile apparatus but also to various other data communication apparatuses, such as a teletex and s telephone.

Figure 4:
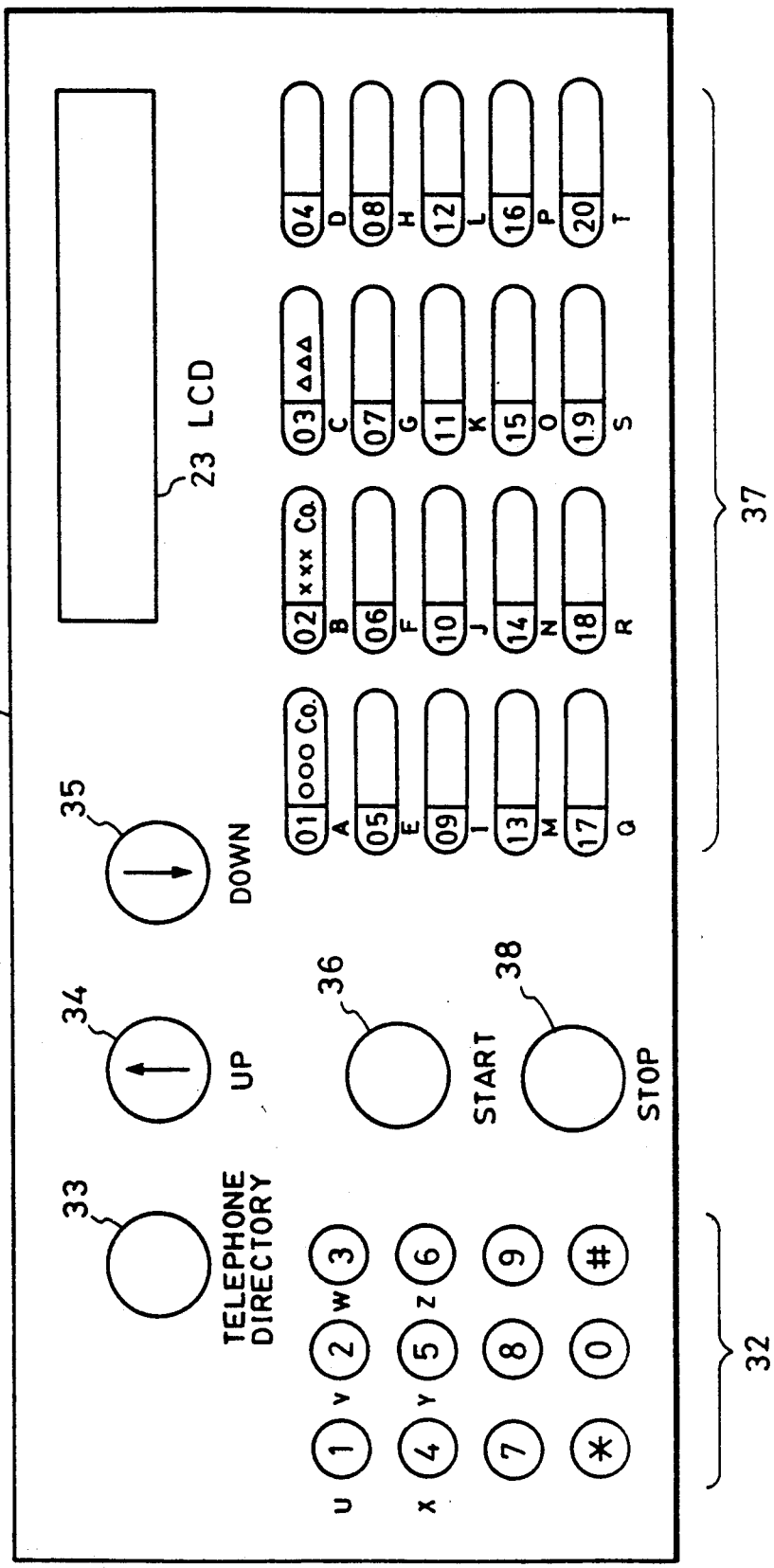
FIG. 4 shows an operation panel.

FIG. 4 shows the key input switches associated with dialing and which are provided in the operation section 21 shown in FIG. 3. In FIG. 4, a key group 32, including ten number keys, * key and # key, is used to input telephone numbers. A switch-over key 33 is used to switch over the operation between retrieval of the telephone numbers in the electronic telephone directory and retrieval of the telephone numbers for which dialing has already been made. An up key 34 is depressed when it is desired to shift up the retrieval address of the memory 22. To shift down the retrieval address of the memory 22, a down key 35 is depressed. A start key 36 is used to give an instruction to dial the telephone number in the memory 22 which is designated by the retrieval address. One-touch dialing keys 37 have an abbreviated number from 01 to 20. Data, such as telephone number, abbreviated destination name or dialing time in the memory 22 designated by the retrieval address, is displayed on the LCD 23.

The second embodiment will be outlined with reference to FIGS. 5 to 8.

FIG. 5 shows an example of the recording format of telephone numbers for automatic dialing which are recorded in a recording portion in the facsimile apparatus body. Data contained in one line of the list shown in FIG. 5 is set to a single telephone number. Hereinafter, the data contained in the one line is referred to as a "telephone number memory block".

"Telephone number memory block" consists of, for example, a telephone number recording portion in which numeric characters and symbols, such as hyphen, space and pause, can be recorded up to in 32 digits at a maximum, an address recording portion in which 16 or 8 characters can be recorded in the case of JIS 8 bit code or 2 byte code, and an attribute recording portion in which data peculiar to each telephone number can be recorded so as to make data exchange in facsimile communication smooth, such as the type of destination facsimile apparatus, the maximum transmission rate of the destination facsimile apparatus, and the fact whether or not the transmission line is affected by delay of electric signals due to overseas telecommunications. Attributes, such as "for telephone", "for facsimile (for data communication)" and "common", which characterize the present embodiment, are also recorded in this attribute recording portion.

As shown in FIG. 5, a plurality of "telephone number memory block"s are contained in a single facsimile apparatus. The number of "telephone number memory block"s is the number of "telephone numbers (destinations) for which automatic dialing can be made" that can be registered in that facsimile apparatus. In the example shown in FIG. 5, 100 "telephone numbers for automatic dialing" can be registered.

In the three types of attributes, "for telephone", "for facsimile" and "common", the telephone number can have only one attribute at one time. Therefore, 2-bit data is enough to express these attributes, as shown in FIG. 6. The individual states (for states in total) of 2-bit data respectively define these attributes. In the list shown in FIG. 6, "Non-registered" attribute indicates that "telephone number memory block" is not in use.

In the case of the abbreviated dialing, single "telephone number memory block" shown in FIG. 5 corresponds to one single abbreviated telephone number. The abbreviated dialing system of this embodiment is not of the type in which a simple abbreviated dialing number is designated and dialed but of the "electronic telephone directory" type in which the telephone number to be dialed is selected from among a list in which the telephone numbers are arranged in alphabetical order.

In the electronic telephone directory, the registered "telephone numbers for automatic dialing" are sorted not in the order in which they are registered but in alphabetical order to make retrieval easy. When this sorting is performed, it is not necessary to refer to the attribute data shown in FIG. 6, i.e., bit-1 and bit-0.

When the user desires to perform automatic dialing using the "electronic telephone directory", he or she "opens" the "electronic telephone directory" first. In practical operation, the "electronic telephone directory" mode is achieved by a predetermined key operation. Thereafter, selection is made of the type of display, i.e., it is determined whether all the "telephone numbers for automatic dialing" registered are displayed or whether specified ones, for example, those whose destination name starts with a letter "o" are displayed. In "telephone with facsimile", among the "telephone numbers for automatic dialing" which satisfy the designated conditions, only the telephone numbers and corresponding destination names, only destination names, or only telephone numbers are displayed in sequence on the display section. The display section of this type of telephone or facsimile apparatus can generally display only a limited amount of data, for example, 16 to 40 characters in the case of 1 byte code. Therefore, when a plurality of "telephone numbers for automatic dialing" are to be displayed, these data items may be scrolled by key operation of the user.

In this embodiment, when dialing is done in the telephone mode, retrieval is made of both "telephone numbers for automatic dialing" having the attribute "for telephone" and "telephone numbers for automatic dialing" having the attribute "common". When dialing is done in the facsimile mode, retrieval is made on both telephone numbers for automatic dialing" having the attribute "for facsimile transmission" and "telephone numbers for automatic dialing" having the attribute "common". In practical operation, when dialing is done in the telephone mode, retrieval is made of the data shown in FIG. 5 in which bit-0 of the attribute bits is 1. When a dialing is made in the facsimile transmission mode, the data whose attribute bit, bit-1, is 1 is retrieved.

Although the number of bits for determining the attribute is increased from 1 bit to 2 bits, the number of bits used for retrieval remains the same. Therefore, the retrieval time remains the same as that for conventional facsimile apparatus.

One-touch dialing will now be described in detail. In the one-touch dialing, two "telephone numbers for automatic dialing", "a telephone number for automatic telephone dialing" and "a telephone number for automatic facsimile dialing", can be registered at maximum with a single one-touch dialing key. It is, however, noted that since "common telephone number for automatic dialing" acts as the two "telephone numbers for automatic dialing", when a "common telephone number for automatic dialing" is registered, other "telephone numbers for automatic calling" cannot be registered. Therefore, various types of processing shown in FIG. 7 are performed in accordance with the combination of the attributes of a presently registered "telephone number for automatic dialing" and the attribute of "a telephone number for automatic dialing" to be newly registered. The processing listed in the columns located at the right half of the list shown in FIG. 7 will be described in detail below. The processing shown in FIG. 7 are designed such that the user need not take into consideration the new registration and alteration of the already registered contents. Determination of whether the input data is concerned with registration or alteration is made by software.

a) New Registration

This process is executed when no data has been registered for telephone, for facsimile transmission or common. The registration procedures are the same as the conventional ones. That is, (1) Telephone number is input. is input.
(2) Address
(3) When the attribute is either "for facsimile transmission" or "common", the transmission rate, the position of the header and other types of attributes used for communication management, are also designated.

Regarding the items (1) and (2), either of them can be performed first.

Designation of the attribute (whether the data is for telephone, for facsimile transmission or common) is conducted before this process begins.

b) Registration Amendment Operation

This process is executed when the already registered data is altered without altering the attribute data, "for telephone", "for facsimile transmission" or "common". In this process, a telephone number, a destination name or attributes other than the attribute data, such as "for telephone", "for facsimile" or "common" are altered, In other words, the already registered attributes are determined (the maximum number of "telephone numbers for automatic dialing" is two). If it is found that the currently altered telephone number has the same attribute as that of the already registered data, this process is selected.

The user displays the already registered contents on the display section, and then changes the displayed data through key operations.

c) Reference Registration Operation (1)

This process is executed to newly register a telephone number for automatic dialing having the attribute of facsimile transmission when "the telephone number for automatic telephone dialing" has been registered or to newly register a telephone number for automatic dialing having the attribute of telephone when "the telephone number for automatic facsimile dialing" has been registered.

The contents of the registration are the same as those of "a) New Registration Operation". However, before the registration operation begins, the following determination is made: whether the registration contents of "the telephone number for automatic facsimile dialing" are copied when "a telephone number for automatic telephone calling" is to be registered or whether the registration contents of "the telephone number for automatic telephone dialing" are copied when "a telephone number for automatic facsimile dialing" is to be registered. It is, however, quite rare that the copied contents can be used without alteration. In most cases, they must be corrected.

This copying and correction operation is called "Reference Registration Operation". The "Reference Registration Operation" is advantageous in the following case: assume that telephone number, "03-3117-1234", and data, "0000FAX24div.", are registered in one-touch dialing key No. 01 as "the telephone number for automatic telephone dialing". Telephone number, "03-3117-1235", and destination name, "0000FACSIMILE", can be registered in the same one-touch dialing key No. 01 as "the telephone number for automatic facsimile dialing" by making a copy of the already registered "telephone number for automatic telephone dialing" and then by altering the last digit of the telephone number and the portion of the destination name that follows "0000FA". In most cases, "the telephone number for automatic telephone dialing" and "the telephone number for automatic facsimile dialing" registered in the same one-touch key are the telephone number and facsimile telephone number for the same destination. Therefore, this copying function could be advantageous.

When the copying function is used, the same process as that of "b) Registration Amendment Operation" is conducted after copying. When the copying function is not used, the same process as that of "a) New Registration Operation" is performed.

d) Reference Registration Operation (2)

This process is executed to newly register "a common telephone number for automatic dialing" when either "the telephone number for automatic telephone dialing" or "the telephone number for automatic facsimile dialing" is already registered. Registration of "a common telephone number for automatic calling" when either "the telephone number for automatic telephone dialing" or "the telephone number for automatic facsimile dialing" is already registered means that a plurality of processing exists to achieve one object. However, this is logically inconsistent and is impossible to program.

When both "the telephone number for automatic telephone dialing" and "the telephone number for automatic facsimile dialing" are already registered, "e) Reference Registration Operation (3)" to be described later, is conducted.

In this process, since either "the telephone number for automatic telephone dialing" or "the telephone number for automatic facsimile dialing" is already registered, selection is made on "copy/do not copy" as in the case of "c) Reference Registration Operation (1)".

After the copying function is used, the same process as that of "b) Registration Amendment Operation is conducted. When the copying function is not used, the same process as that of "a) New registration Operation" is conducted.

The moment "the common telephone number for automatic dialing" is registered, the registered contents of "the telephone number for automatic telephone dialing" or "the telephone number for automatic facsimile dialing" are invalidated.

Figure 8:
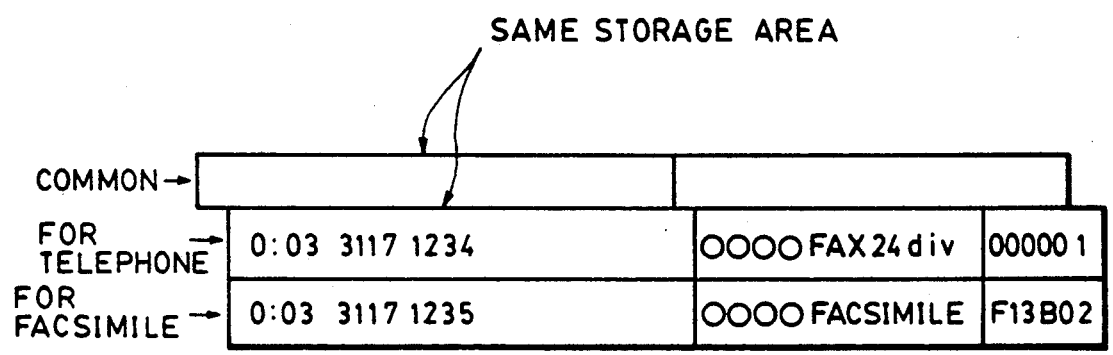
FIG. 8 shows a memory block for a one-touch dialing key.

From the viewpoint of effective utilization of the memory, "a common telephone number for automatic dialing" may generally be stored in the storage area which is superimposed on the storage area where "a telephone number for automatic telephone dialing" or "a telephone number for automatic facsimile dialing" is stored, as shown in FIG. 8. This is possible because "the common telephone number for automatic dialing" cannot coexist with the other two telephone numbers. Alternatively, "a common telephone number for automatic dialing" may be stored in the storage area which is superimposed on the storage areas where "a telephone number for automatic telephone dialing" and "a telephone number for automatic facsimile dialing" are stored. In this case, the same data is stored at a plurality of locations in the memory, and is thus disadvantageous in terms of consistency of the data. However, the reference operation is facilitated.

e) Reference Registration Operation (3)

This process is executed to newly register "a common telephone number for automatic dialing" when both "the telephone number for automatic telephone dialing" and the telephone number for automatic facsimile dialing" are already registered.

In this case, since there are a plurality of "telephone numbers for automatic dialing" that can be referred to, two selections must be made, first, "copy/do not copy" and then, when copying is done, which "telephone number for automatic dialing is to be referred to". The user simply makes a selection from three choices, "not copied"; "telephone number for automatic telephone dialing is copied"; "telephone number for automatic facsimile dialing is copied". After the selection, the same process as that of "d) reference registration Operation (2)" is conducted.

The moment "the common telephone number for automatic calling" is registered, the registered contents of "the telephone number for automatic telephone dialing" and "the telephone number for automatic facsimile dialing" are invalidated.

This process is executed to newly register "a telephone number for automatic telephone dialing" or "a telephone number for automatic facsimile dialing" when "the common telephone number for automatic dialing" is already registered.

In this case, there is one data item which is copied as in the case of "d) Reference Registration Operation (1)". However, the copied data may be used to obtain two types of data, "the telephone number for automatic telephone dialing" and "the telephone number for automatic facsimile dialing". For example, the telephone number for the destination party who has a telephone attached with a facsimile is classified as "common" because that telephone number is used for both facsimile transmission and for conversation. In that case, a person's name may be registered as the receiving party's name. The enterprise to which that party is affiliated may introduce a digital private branch exchange (PBX) system for office automation, and that facsimile telephone number may not be used any longer. In this case, another facsimile number must be registered, and the party's name must be changed from the person's name to the name of the enterprise. This may be achieved easily by making a copy of the original data as "the telephone number for automatic telephone dialing" only.

Another case is the office under private management which is provided with a telephone attached with a facsimile machine. A dedicated telephone line for facsimile use exclusively may be installed in that office in order to cope with an increased amount of telecommunications data. In that case, two different numbers are used for telephone and facsimile transmission. These two numbers may be registered easily by making two copies of the receiving party's name of "the common telephone number for automatic dialing" to create the receiving party's name for "a telephone number for automatic telephone dialing" and that for "a telephone number for automatic facsimile dialing".

Thus, the type of copying is not automatically determined but must be selected by the user. The user makes a selection about copying from four choices, including: not copied/copy the telephone number for automatic telephone dialing/copy the telephone number for automatic facsimile dialing/copy both telephone numbers for automatic dialing. After the selection is made, the same process as that of "d) Reference Registration Operation (2)" is conducted.

The moment "the telephone number for automatic telephone dialing" and "the telephone number for automatic facsimile dialing" are registered, the registered contents of "the common telephone number for automatic dialing" are invalidated.

Dialing made using the registered "telephone numbers for automatic dialing" will be described in detail below.

When one of the one-touch dialing keys is depressed, the control section checks whether the original to be transmitted is placed on the original reading section. If the original to be transmitted is located on the reading section, the control section determines that the one-touch dialing key is depressed in order to transmit the original of the facsimile transmission. If the original to be transmitted is not located, the control section determines that dialing is to be made for conversation. In the former case, if either "the telephone number for automatic facsimile dialing" or "the common telephone number for automatic dialing" has been registered in the depressed one-touch dialing key, that telephone number is dialed. If neither "the telephone number for automatic facsimile dialing" nor "the common telephone number for automatic dialing" is registered, the control section displays an alarm message, that the telephone number to be dialed is not registered. In the case of the latter, if either "the telephone number for automatic telephone dialing" or "the common telephone number for automatic dialing" has been registered in the depressed one-touch dialing key, that telephone number is dialed. If neither of them is registered, the control section displays an alarm message, that the telephone number to be dialed is not registered.

Automatic dialing is thus made using the one-touch dialing keys.

FIGS. 9 to 14 are flowcharts showing the control operations performed by the control section 24 in this embodiment. The operation of the second embodiment will now be described with reference to FIGS. 9 to 14.

Figure 9:
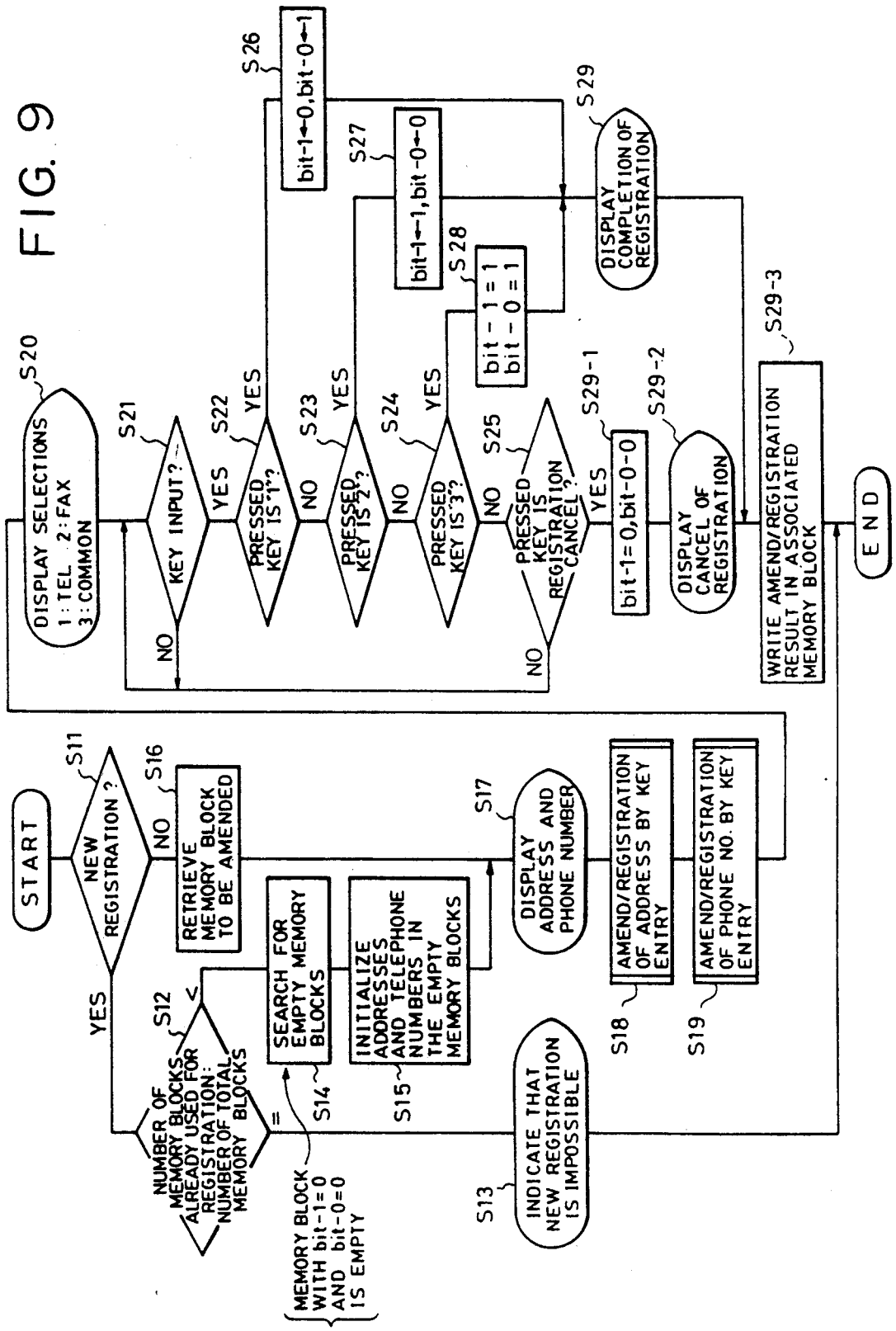

FIG. 9 shows the electronic telephone directory registration routine.

It is determined in step S11 whether or not the registration is a new registration. If it is the new registration, the process goes to step S12 and the number of currently used memory blocks is compared with the total number of memory blocks. The two numbers being equal means that telephone numbers are registered in all the memory blocks. Therefore, in step S13, control section 24 displays a message on the display portion 23, that new registration cannot be made, thereby completing registration process.

If it is determined in step S12 that the number of currently used memory blocks is smaller than the total number of memory blocks, an empty memory block is searched for in step S14. Thereafter, the area of that memory block is cleared in step S15, and the remote party's name and telephone number stored in that memory block area are displayed in step S17. In this case, neither the remote party's name nor telephone number is registered and neither the remote party's name nor telephone number is displayed.

Next, in step S18, the remote party's name is registered by the key input, and then the telephone number is registered by the key input in step S19. Subsequently, in step S20, display is made, for input of the attribute data (for example, "1: for telephone, 2: for facsimile, 3: common" will be displayed), and then it is determined in step S21 that there is a key input. If there is a key input, the type of key input is determined in steps S22, S23, S24 and S25. If it is determined in step S22 that is "1" is input, 0 and 1 (attribute data indicating for telephone) are respectively assigned to bit-1 and bit-0, and then the process proceeds to step S29.

If it is determined in step S23 that "2" is input, 1 and 0 (attribute data representing for facsimile) are respectively assigned to bit-1 and bit-0 in step S27, and then the process goes to step S29.

If it is determined in step S24 that "3" is input, 1 and 1 (attribute data representing common) are respectively assigned to bit-1 and bit-0, and then the process goes to step S29.

If it is determined in step S25 that suspension of registration is input, 0 and 0 are respectively assigned to bit-1 and bit-0 in step S29-1, the display section 23 displays suspension of registration in step S29-2, and the process goes to step S29-3.

In step S29, the display section 23 displays completion of registration. In step S29-3, the results of the registration are written in the memory block.

If it is determined in step S11 that the registration is not a new registration (i.e., that an amendment registration is made), the memory block to be amended is retrieved in step S16. Thereafter, the remote party's name, telephone number and attribute data stored in that memory block are displayed in step S17, and then the remote party's name or telephone number is amended in steps S18 and S19. Thereafter, the same processing executed in the new registration is conducted.

The receiving party's name, telephone number and attribute data are thus registered in the electronic telephone directory.

Figure 10:
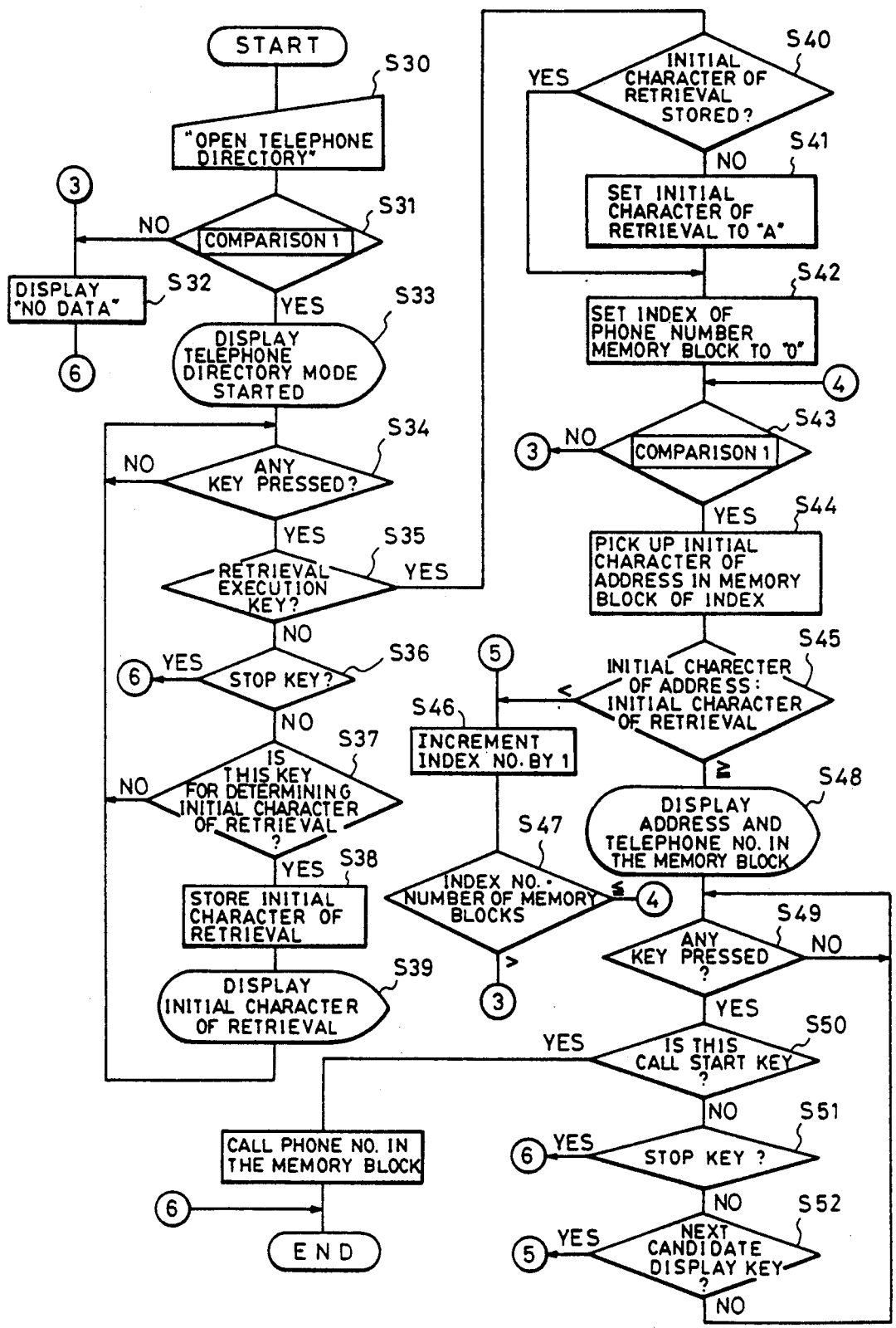

FIGS. 10 and 11 show the routine of dialing conducted using the electronic telephone directory.

First, the operator selects the telephone directory mode in step S30. Once the electronic telephone directory dialing mode is selected, the process goes to step S31, and "a" (from steps S311 to S314) in Comparison Process 1 shown in FIG. 11(a) is executed if no original is located in the reading section 16 while "b" (from steps S315 to S318) in Comparison Process 1 shown in FIG. 11(b) is executed if the original is located.

Figure 11A:
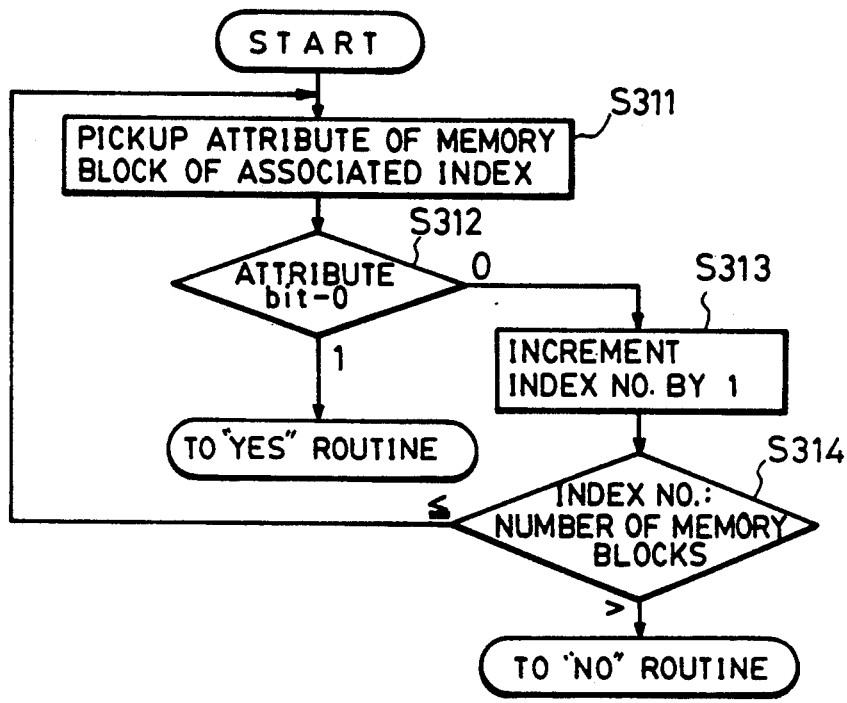

In "a" of Comparison Processing 1 shown in FIG. 11(a), it is determined in step 312 whether or not there is at least one memory block whose attribute bit-0 is 1 (whose attribute is telephone or common) in the electronic telephone directory. If there is at least one telephone number for automatic telephone dialing or common telephone number for automatic dialing, the process goes to step S33 shown in FIG. 10. If there is no telephone number for automatic telephone dialing or common telephone number for automatic dialing, the process goes to step S32 shown in FIG. 10.

Figure 11B:
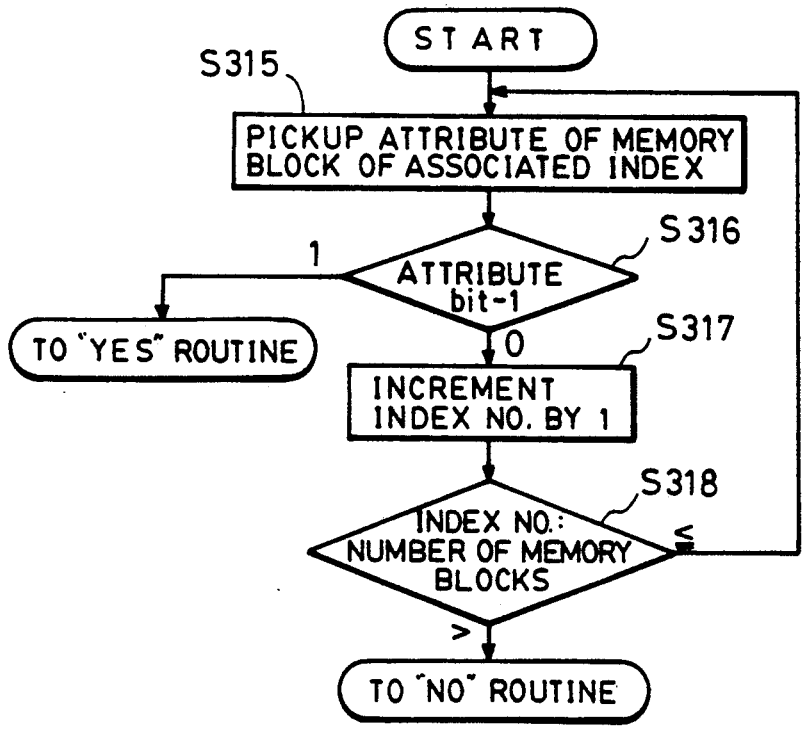

In "b" of Comparison Processing 1 shown in FIG. 11(b), it is determined similarly in step 316 whether or not there is at least one memory block whose attribute bit-1 is 1 (whose attribute is facsimile transmission or common) in the electronic telephone directory. If there is at least one telephone number for automatic facsimile dialing or common telephone number for automatic dialing, the process goes to step S33 shown in FIG. 10. If there is no telephone number for automatic facsimile dialing or common telephone number for automatic dialing, the process goes to step S32 shown in FIG. 10.

In Comparison Processing 1 shown in FIGS. 11(a) and 11(b), if there is no memory block whose attribute is telephone in the electronic telephone directory (when no original is located in the reading section), or if there is no memory block whose attribute is facsimile transmission (when the original is located), the display section 23 displays a message, that there is no data to be dialed in step S32, thereby completing the dialing processing.

If there are memory blocks whose attribute is telephone or facsimile transmission in the electronic telephone directory, the display portion 23 displays that the facsimile apparatus is in the dialing mode which uses the electronic telephone directory in step S33 shown in FIG. 10. Thereafter, key input is awaited in step S34. Once there is a key input, it is determined in step S35 whether or not retrieval execution key is input, in step S36 whether or not stop key is input, and in step S37 whether or not the key for determining the initial character for retrieval is input. If it is determined in step S36 that the stop key is input, the processing is ended. If it is determined in step S37 that the key for determining the initial character of the destination party to be retrieved is input, the data (the character code) on the initial character for retrieval is stored in step S38. Thereafter, in step S39, the initial character for retrieval is displayed on the display portion 23, and then the process returns to step S34.

If it is determined in step S35 that the retrieval execution key (start key) is input, it is determined in step S40 whether or not the initial character for retrieval is stored. If the answer is yes, the process goes to step S42. If no initial character for retrieval is stored, "A" is set as the initial character for retrieval in step S41, 33 and then the process goes to step S42.

In step S42, 0 is set as the index No. for the telephone number memory block, and in step S43, Comparison Processing 1 shown in FIG. 11 is executed. In Comparison Processing 1, if no original is placed in the reading section, a memory block whose attribute is telephone or common use is selected. If there is an original in the reading section, a memory block whose attribute is facsimile transmission or common is selected. Next, in step S44, the initial character (character code) of the destination party stored in the selected memory block is read out, and in step S45 it is determined whether or not the initial character (character code) of the destination party coincides with that (character code) for retrieval. If the answer is negative, index No. for selecting the memory block is incremented in step S46, and then index No. is compared with the total number of memory blocks in step S47 so as to determine whether or not retrieval is completed on all the memory blocks. If retrieval is made on all the memory blocks, the process is ended. If there are memory blocks to be retrieved, the process returns to step S43, and a subsequent memory block having the corresponding attribute is selected. If it is determined in step S45 that the two character codes coincide with each other, the data on the destination party and telephone number is read out from the selected memory block in step S48 and is displayed on the display section 23, and then the process goes to step S49.

In step S49, a key input is awaited. When there is a key input, it is determined in step S50 whether or not a dialing starting key is input, in step S51 whether or not a stop key is input and in step S52 whether or not a subsequent candidate display key (upper key or lower key) is input. If the stop key is input, the process is ended. If the subsequent candidate display key is input, the process goes from step S52 to step S46. If the dialing starting key is input, the process goes from step S50 to step S53 and the data on the telephone numbers stored in the selected memory blocks are sent out to the dialer 25 in sequence. When all the telephone numbers are sent out, the process is ended.

The dialing process using the electronic telephone directory is thus conducted.

Figure 13:
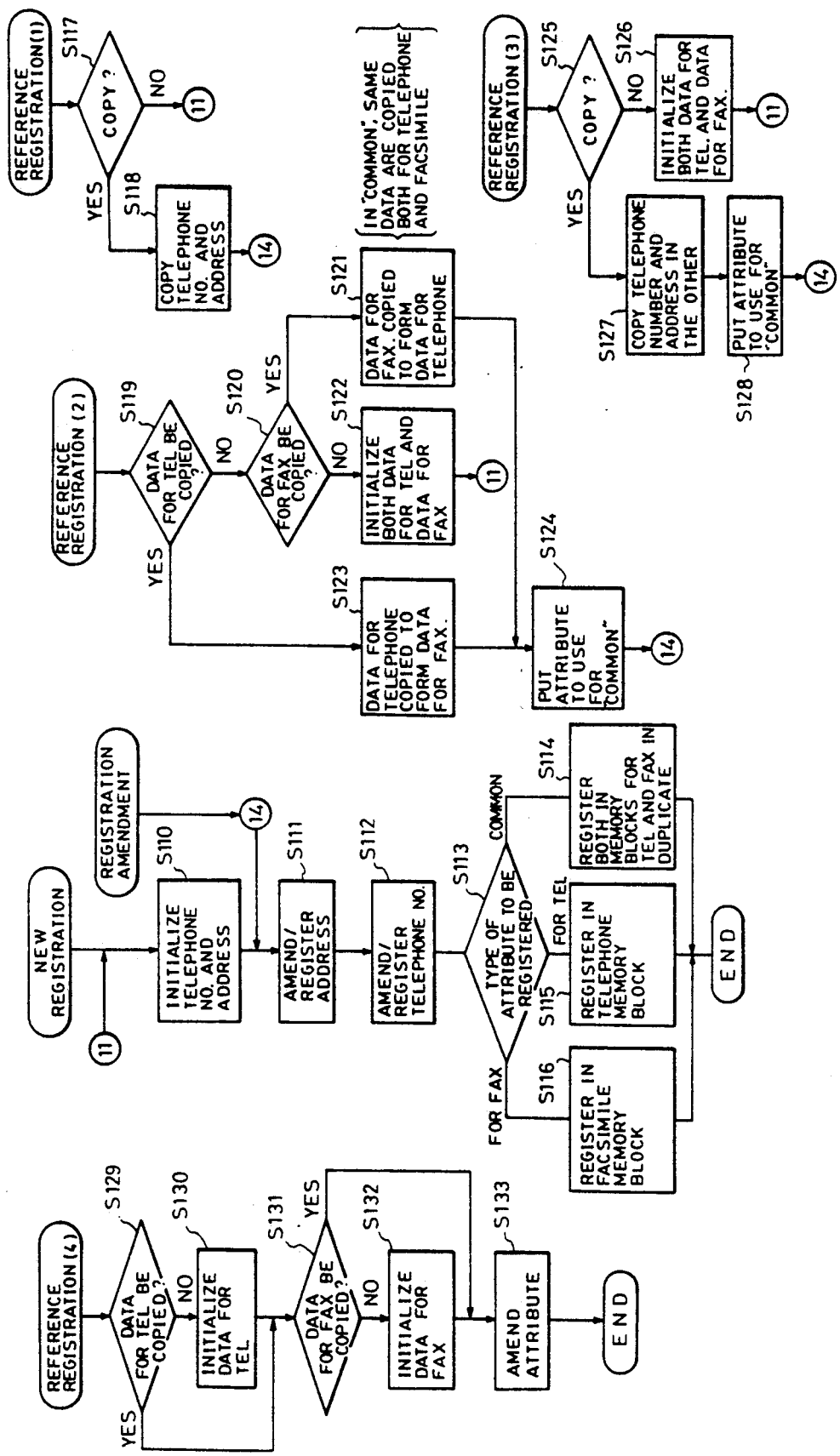

FIGS. 12 and 13 show the routine for registering the telephone number, destination party and attribute data in a one-touch dialing key. In this embodiment, both the memory block for facsimile and that for telephone are provided in a single one-touch dialing key.

When the one-touch dialing key registration mode is selected by a predetermined key input, it is determined in step S100 whether or not the telephone number for telephone communication is already registered in the designed one-touch dialing key. If the telephone number for telephone conversation is registered, it is determined in step S101 whether or not the telephone number for facsimile transmission is already registered in the designated one-touch dialing key.

If it is determined in step S100 that the telephone number for telephone communication is not registered, it is determined in step S104 whether or not the telephone number for facsimile transmission is registered. If it is determined in step S104 that the telephone number for facsimile transmission is not registered, it is determined in step S106 whether or not the common telephone number is registered.

If it is determined in steps S100, S101, S104 and S106 that the telephone numbers for telephone communication and facsimile transmission are registered, the process goes from step S101 to S102 and the attribute to be registered is determined in step S102. If the attribute to be registered is for telephone communication or for facsimile transmission, the registration amendment operation routine (from steps S111 to S116) shown in FIG. 13 is executed. If the attribute to be registered is common, the reference registration operation (3) routine (from steps S125 to S128, S110 to S116) shown in FIG. 13 is executed.

If it is determined in steps S100, S101, S104 and S106 that the telephone number for telephone communication alone is registered, the attribute of the telephone number to be registered is determined in step S103. If the attribute to be registered is for facsimile transmission, the reference registration operation (1) routine (from steps S117, S118, S110 to S116) shown in FIG. 13 is executed. If the attribute to be registered is for telephone communication, the registration amendment operation routine shown in FIG. 13 is executed. If the attribute to be registered is common, the reference registration operation (2) routine (from steps S119 to S124 and S110 to S116) is executed.

If it is determined in steps S100, S101, S104 and S106 that the telephone number for facsimile transmission alone is registered, the process goes from step S104 to S105 and the attribute to be registered is determined. If it is determined that the attribute to be registered is for facsimile transmission, the registration amendment operation routine is executed. If it is determined that the attribute to be registered is for telephone communication, the reference registration operation (1) routine is executed. If the attribute to be registered is common, the reference registration operation (2) routine is executed.

If it is determined that the common telephone number alone is already registered, the process goes from step S106 to step S107, and the attribute to be registered is determined. If the attribute to be registered is for facsimile transmission and/or telephone communication, the reference registration operation (4) routine (steps S129 to S133) shown in FIG. 13 is executed. If the attribute to be registered is common, the registration amendment operation routine is executed.

If the telephone number is not registered at all, the process goes from step S106 to the new registration operation routine (steps S110 to S116) shown in FIG. 13 is executed.

In the new registration operation routine shown in FIG. 13, the telephone number and destination data on the designated one-touch dialing key are initialized in step S110. Next, in step S111, destination data is registered in accordance with the operation conducted by the operator, and in step S112, telephone number data is registered. In step S113, the attribute to be registered is determined. If it is determined in step S113 that the registration is for facsimile transmission, the destination and telephone number data input in steps S111 and S112 is stored in the memory block for facsimile transmission in step S116. If the registration is for telephone communication, the destination and telephone number data input is stored in the memory block for telephone in step S115. If the registration is common, the destination and telephone number data is stored in the memory blocks for facsimile and telephone in step S114.

In the registration amendment operation routine, the destination and telephone number data on the designated one-touch dialing key is amended in steps S111 and A112. Thereafter, the processes from steps S113 to S116 are executed.

In the reference registration operation (1) routine, it is determined in step S117 whether or not the destination and telephone number data in the already registered memory block is to be copied in the other memory block. If the already registered memory block is not to be copied, the process goes to step S110. If the already registered memory block is to be copied, the telephone number and destination data is copied in step S118, and then the process goes to step S111. Thereafter, the processes from step S110 to S116 are executed.

In the reference registration operation (2) routine, it is determined in step S119 and S120 whether or not the data in the memory block for telephone is to be copied and whether or not the data in the memory block for facsimile transmission is to be copied. If it is determined that the data in the memory block for telephone is to be copied, the process goes from step S119 to step S123, and the data in the memory block for telephone is copied in the memory block for facsimile transmission. Thereafter, the attribute is altered to common in step S124, and then the process proceeds to step S111. If the data in the memory block for facsimile transmission is to be copied, the process goes from step S120 to step S121, and the data in the memory block for facsimile is copied in the memory block for telephone. Thereafter, the process goes to step S124. If it is determined that neither of the data is to be copied, the process goes from step S120 to S122 and the both memory blocks are initialized. Thereafter, the process goes to step S110.

In the reference registration operation (3) routine, it is determined in step S125 whether or not the data in one of memory blocks is to be copied in the other memory block. If the data is not to be copied, the data in both memory blocks is initialized in step S126, and then the process goes to step S110. If copying is made, the data in the memory block designated by the operator is copied in the other memory block, and then the attribute is altered to common in step S128. Thereafter, the process goes to step S111.

In the reference registration operation (4) routine, it is determined in step S129 whether or not the data in the memory block for telephone is to be copied. If copying is not made, the memory block for telephone is initialized in step S130. Thereafter, it is determined in step S131 whether or not the data in the memory block for facsimile is to be copied. If copying is not made, the memory block for facsimile is initialized in step S132. Thereafter, the attribute is amended in step S133.

Destination, telephone number and attribute data are thus registered in a one-touch dialing key.

Figure 14:
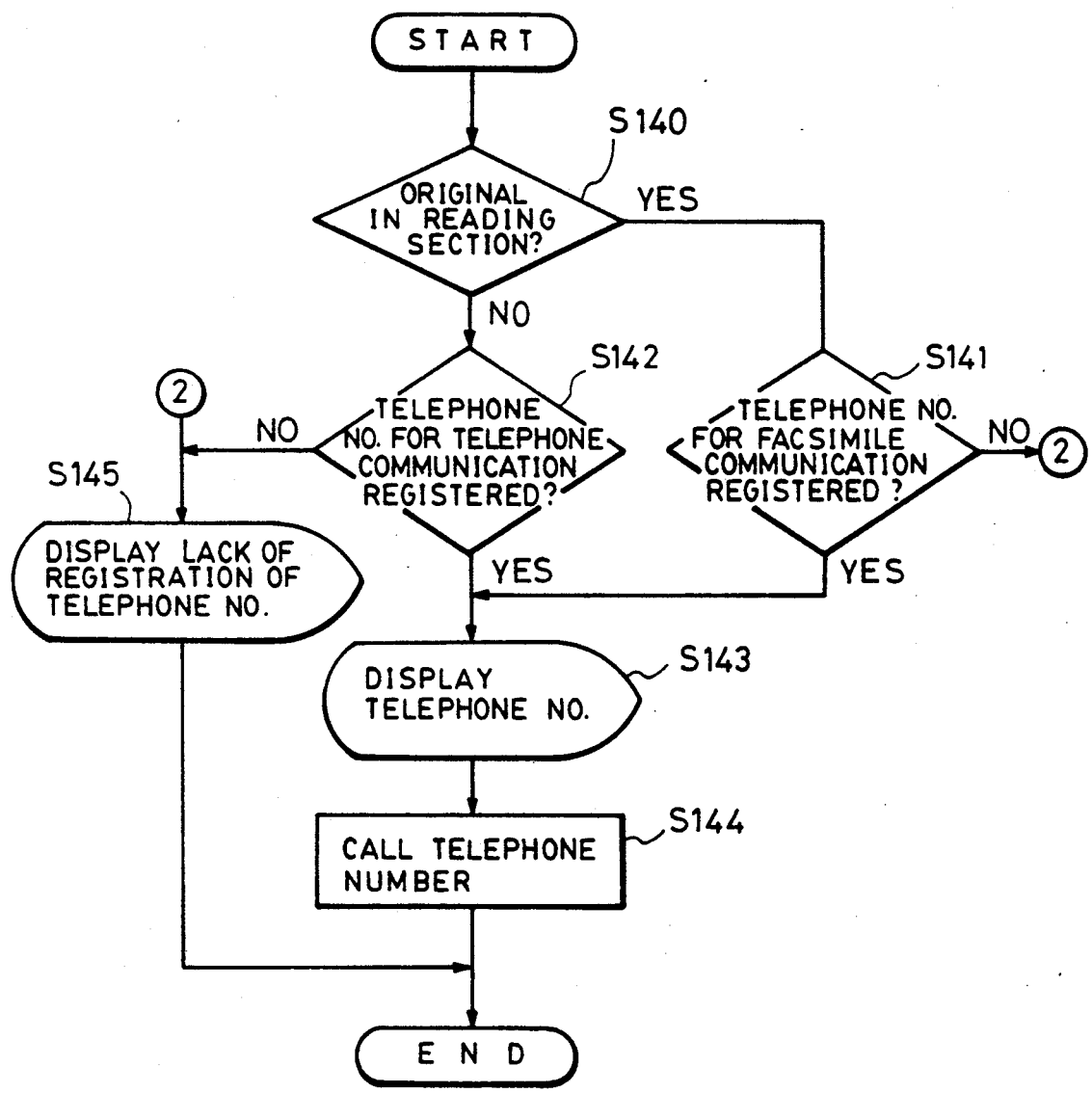

FIG. 14 is a flowchart showing the dialing routine which uses a one-touch dialing key.

When the operator depresses a one-touch dialing key, it is determined in step S140 whether or not the original documents are located in the reading section 26. If the originals are set, it is determined in step S141 whether or not the telephone number for facsimile transmission is registered in the depressed one-touch dialing key. If no telephone number is registered, the display section 23 displays a message indicating that no telephone number is registered in step S145. If it is determined in step S141 that the telephone number for facsimile transmission is registered, the display section 23 displays telephone number and destination in step S143, and then that telephone number is dialed in step S144.

If it is determined in step S140 that no original is set, it is determined in step S142 whether or not the telephone number for telephone is registered in the depressed one-touch dialing key. If the answer is yes, the process goes to step S143. If the answer is negative, the process goes to step S145.

Thus, dialing is done using the one-touch dialing keys.

In the second embodiment, each of the telephone numbers stored in the electronic telephone directory or one-touch dialing keys has the attribute selected from telephone, facsimile transmission and common. The telephone numbers having the attribute of common can be used in both automatic telephone and facsimile transmission dialings. Consequently, operator efficiency can be improved. Furthermore, the operation conducted by the operator in order to register telephone numbers in the electronic telephone director or one-touch dialing keys can be facilitated.

A third embodiment of the present invention will now be described. In this embodiment, a plurality of telephone numbers are registered in a single abbreviated dialing key. One of the plurality of telephone numbers is selected in accordance with the time at which that abbreviated dialing key is operated, and dialing is made using the selected telephone number.

Figure 15:
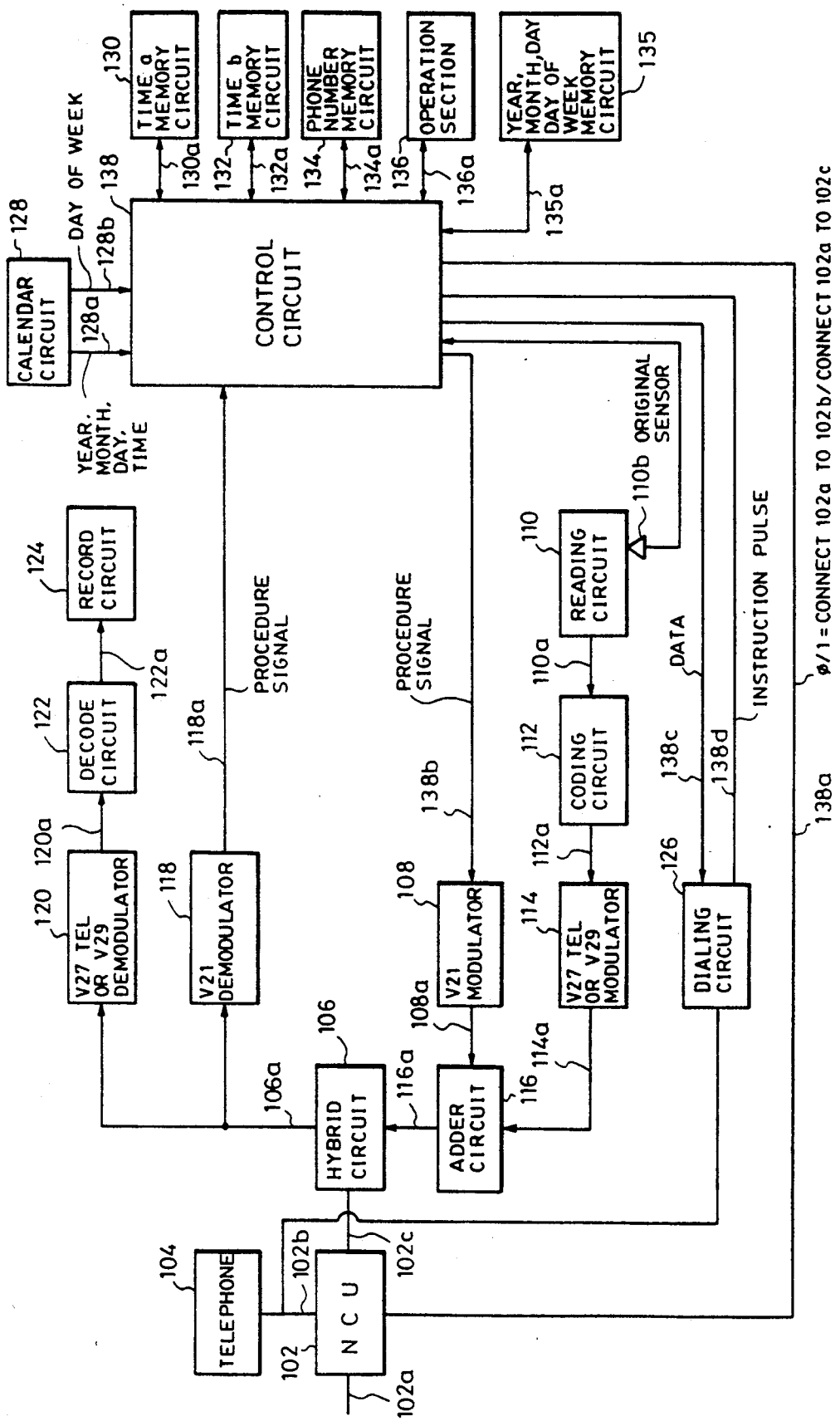
FIG. 15 is a block diagram of a third embodiment of the facsimile apparatus according to the present invention.

FIG. 15 is a block diagram of the third embodiment of the facsimile apparatus according to the present invention.

In the configuration shown in FIG. 15, a network control unit (NCU) 102 is connected to the terminal of a telephone line for controlling connection to the telephone switching network, for switching over the telephone network to a data transmission path or for maintaining a loop. A telephone line 102a is connected to the NCU 102. The NCU 102 receives a signal on a signal line 138a, and connects the telephone line 102a to a telephone set (to a signal line 102b) when the level of that signal is $\phi$. The NCU 102 receives a signal on the signal line 138a and connects the telephone line 102a to a facsimile apparatus (to a signal line 102c) when the level of that signal is "1". Normally, the telephone line 102a is connected to the telephone set.

Reference numeral 104 denotes a telephone set 104.

A hybrid circuit 106 separates signals on a transmission system from signals on a reception system. That is, the hybrid circuit 106 sends out a transmission signal on a signal line 116a to the telephone line 102a through a signal line 102c and via the NCU 102. Signals from remote terminals pass through the NCU 102 then through the signal line 102c and are output by the hybrid circuit 106 to a signal line 106a.

A modulator 108 performs modulation on the basis of the known CCITT recommendation V21. The modulator 108 receives procedure signals on a signal line 138b, modulates them, and outputs modulated signals on a signal line 108a.

A reader circuit 110 reads image signals for each line in the horizontal direction from an original to be transmitted, and creates a train of binary signals of white and black. The reader circuit 110 may include an imaging device such as a charge-coupled device (CCD) and an optical system. The binary signal train of white and black is output to a signal line 110a.

A coding circuit 112 receives the data output on the signal line 110a, codes it in the modified Huffman (MH) coding system or modified READ (MR) coding system, and outputs the coded data to a signal line 112a.

A modulator 114 performs modulation on the basis of the known CCITT recommendation V27 tel (operated phase modulation) or V29 (orthogonal modulation). The modulator 114 receives signals on the signal line 112a, modulates them, and outputs the modulated data to a signal line 114a.

An adder circuit 116 receives signals from the signal lines 108a and 114a, and outputs the result of the addition to the signal line 116a.

A demodulator 118 performs demodulation on the basis of the known CCITT recommendation V21. The demodulator 118 receives signals on the signal line 106a, performs V21 demodulation and outputs demodulated data to a signal line 118a.

A demodulator 120 performs demodulation on the basis of the known CCITT recommendation V27 tel (operated phase modulation) or V29 (orthogonal modulation). The demodulator 120 receives signals from the signal line 106a, demodulates them and outputs the demodulated data to a signal line 120a.

A decoding circuit 122 receives signals from the signal line 120a, decodes them by the modified Huffman (MH) decoding system or the modified READ (MR) decoding system and outputs the decoded data to a signal line 122a.

A recording circuit 124 receives signals from the signal line 122a and records the signals in a one line at a time sequence.

A dialing circuit 126 receives dialing data present on a signal line 138c when a dialing instruction pulse is generated on a signal line 138d, and outputs a selection signal to a signal line 102b.

A calender circuit 128 outputs the current date and time to a signal line 128a and the current day of the week to a signal line 128b.

Time "a" and time "b" storage circuits 130 and 132 store different times that can be used to designate two times. A first registered telephone number is dialed from time a to time b while a second registered telephone number is dialed from time b to time a. When a write pulse is sent to the storage circuits 130 and 132, times "a" and "b" each in four digits are set. When a read pulse is sent, times "a" and "b" are read out.

A one-touch/abbreviated dialing storage circuit 134 stores 24 locations for one-touch dialing and 50 locations for abbreviated dialing. In each one-touch dialing or abbreviated dialing key, two telephone numbers can be registered. A control circuit 138 sends a write pulse to the telephone number storage circuit 134 to write telephone numbers in the circuit. When a desired telephone number is to be read out from the storage circuit 134, the control circuit 138 sends the data representing the order of the telephone number to be read out first, then sends a read pulse.

A date storage circuit 135 stores the date and day of the week at which the second registered telephone number is to be dialed independent of the time. The control circuit 138 sends a write pulse to the date and day of the week storage circuit 135 when data on the date and day of the week is written in it. The stored date or day of the week can be read out by generating a read pulse in the date and day of the week storage circuit 135.

An operation section 136 includes a plurality of one-touch dialing keys, a plurality of abbreviated dialing keys and so on. The operation section 136 outputs to the control circuit 138 various types of data, including the ten key data, one-touch dialing key data, abbreviated dialing key data, data required for registering times "a" and "b", data required for registering the one-touch and abbreviated dialing, and data required for registering date and day of the week. These various types of data are input by the operator.

The control circuit 138 controls the overall apparatus. The control circuit 138 may include a microcomputer, a ROM, a RAM, and an I/O port. The control circuit 138 performs the following control operations in this embodiment.

If the current date and day of the week are stored in the circuit 135 when a certain one-touch or abbreviated dialing key is depressed, the control circuit 138 dials the second registered telephone number in that one-touch or abbreviated dialing key. If the current date and day of the week are not stored in the circuit 135, the control circuit 138 dials the first telephone number registered in that dialing key from time "a" to time "b" and the second telephone number registered in that dialing key from time "b" to time "a".

Figure 16:
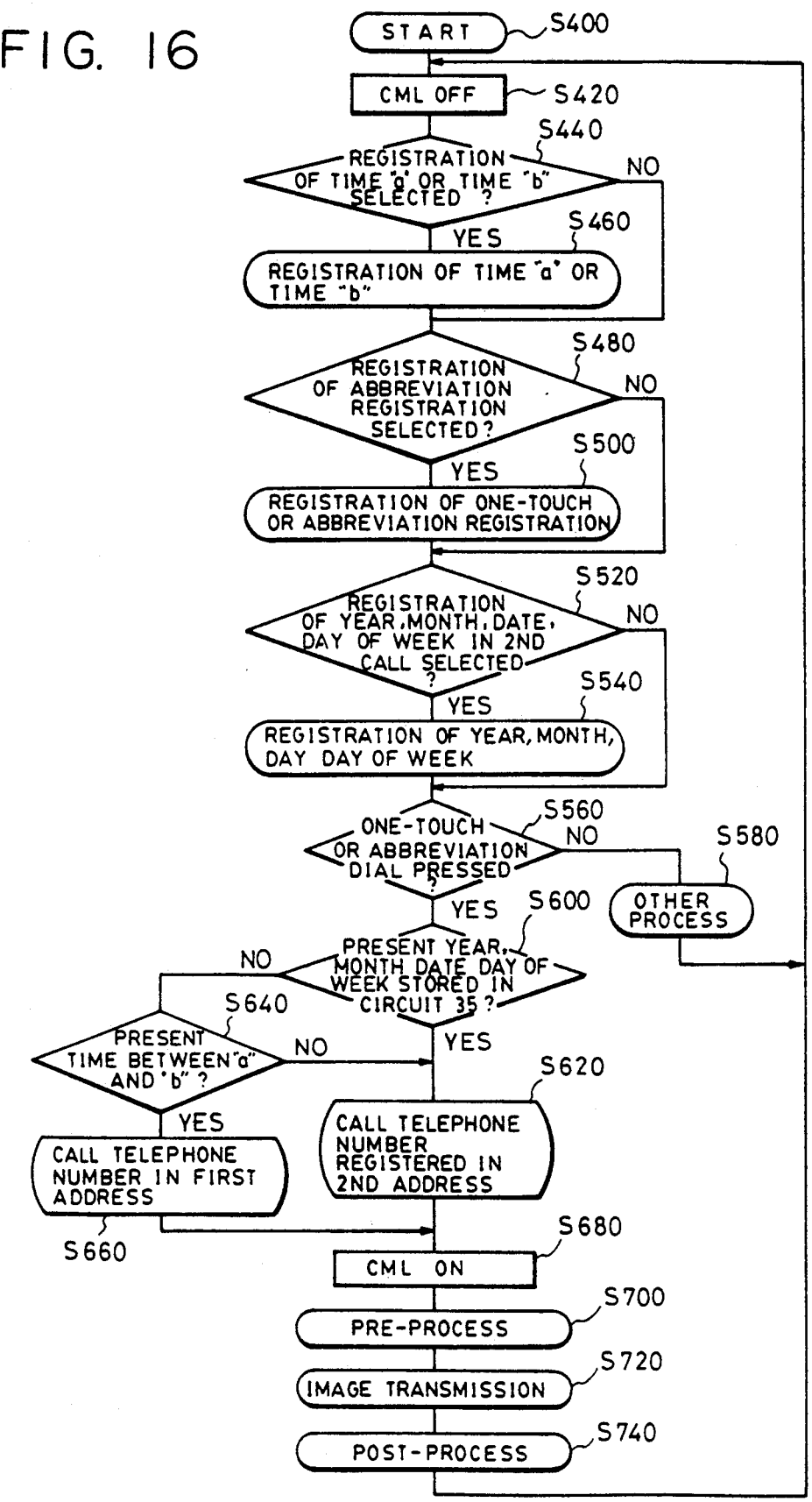
FIG. 16 is a flowchart showing the control operation of the third embodiment.

FIG. 16 is a flowchart showing the control operation of the control circuit 138 of FIG. 15.

In FIG. 16, the control operation is started in step S400 in accordance with the turning on of the power source, and a signal whose level is "φ" is output to the signal line 138a to turn off CML in step S420.

In step S440, it is determined whether or not time "a" or "b" registration mode is selected. If the registration mode is selected, time "a" or "b" is registered through the signal line 130a or 132a in step S460.

In step S480, it is determined whether or not the one-touch or abbreviated dialed telephone number and abbreviated destination name registration mode is selected. If the registration mode is selected, one-touch or abbreviated dialed telephone numbers and abbreviated destination names are registered through the signal line 134a in step S500. In this registration process, two telephone numbers and abbreviated names are registered in a single one-touch dialing key. When each telephone number is registered, data indicating that the telephone number is for telephone or facsimile transmission (e.g., "0" is assigned when the telephone number is for telephone, and "1" is assigned to the telephone number for facsimile transmission) is affixed to the telephone number. The telephone number registered first is called the first telephone number, and that registered subsequent to that is called the second telephone number.

In step S520, it is determined whether or not the mode in which the second telephone number is dialed at predetermined data and day of the week independent of the time set in step S460 (predetermined data and day of the week registration mode) is selected. If this registration mode is selected, the predetermined date and day of the week are registered through the signal line 135a in step S540.

In step S560, it is determined whether or not the one-touch or abbreviated dialing key in the operation section 136 is depressed. If the dialing key is depressed, the process goes to step S600. If the dialing key is not depressed, the process goes to step S580 and performs other processings.

In step S600, the control circuit 138 inputs signals on the signal lines 128a, 128b and 135a to compare the current date and day of the week stored in the calender circuit 128 with the date and day of the week stored in the circuit 135. If two dates and days of the week coincide with each other, the process goes to step S620. If two dates and days of the week do not coincide, the process goes to step S640.

In step S620, the second telephone number registered in the depressed one-touch or abbreviated dialing key is dialed through the signal lines 138c and 138d.

In step S640, the control circuit 138 inputs the signals on the signal lines 128a, 130a and 132a and determines whether or not the current time is between time "a" and time "b". If the current time in the calender circuit 128 is between time "a" and time "b" stored in the circuits 130 and 132, the process goes to step S660. If the current time is between time "b" and time "a", the process goes to step S620.

In step S660, the first telephone number registered in the depressed one-touch or abbreviated dialing key is dialed through the signal lines 138c and 138d.

In step S680, a signal whose level is "1" is output to the signal line 138a to turn on CML. In step S700, the preprocedures of the facsimile transmission are executed. When the transmission mode is set by the preprocedures, image transmission is performed in the set mode in step S720. Once the image transmission is completed, after-procedures of the facsimile transmission are executed in step S740 to check whether the image transmission is completed in normal form. Thereafter, the process returns to step S420.

In this embodiment, two telephone numbers for facsimile transmission are registered in a single one-touch of abbreviated dialing key. However, a telephone number for facsimile transmission and a telephone number for telephone may be registered in a single one-touch or abbreviated dialing key. In this case, where dialing is done, it is determined whether the telephone number selected in accordance with the set time or set data and day of the week is for facsimile transmission for telephone communication (this determination is made using the data attached to the telephone number). If the selected telephone number is for telephone communication, telephone communication may be performed through the telephone set 104.

The operation mode may be manually selected between the mode in which the telephone number to be dialed is selected in accordance with a detection signal of an original document sensor 110b of the reading circuit 110 (shown in FIG. 15) which detects the presence or absence of the original document and the mode in which the telephone number to be dialed is selected by the set time and day of the week. Alternatively, the control operation may include two operation modes.

Figure 17:
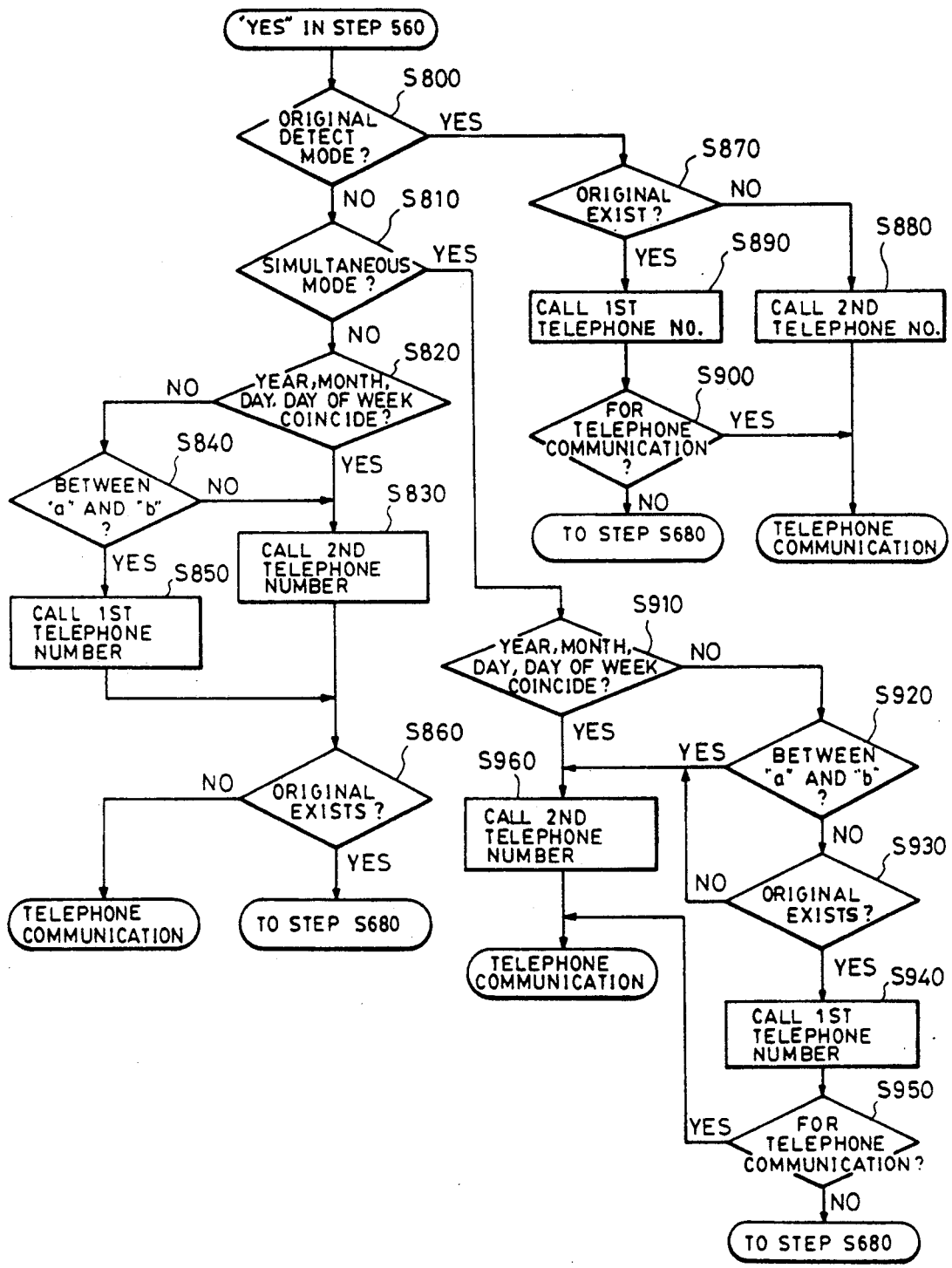
FIG. 17 is a flowchart showing the control operation of a modification of the third embodiment.

FIG. 17 is a flowchart showing a modification of the control operation conducted by the control circuit 138. In this modification, steps S800 to S960 correspond to the steps S600 to S660 shown in FIG. 16.

In this control operation, when a one-touch or abbreviated dialing key is depressed, it is determined in steps S800 and S810 whether the operation mode of the facsimile apparatus is in the original document detection mode, time and day of the week mode or a combination mode. If the apparatus is in the original document detection mode, the process goes from step S800 to S870, and it is determined whether or not the original document is set in the reading circuit 110. If the original document is set, the first telephone number in the depressed one-touch or abbreviated dialing key is dialed in step S890. If it is determined in step S870 that the original document is not set, the second telephone number in the depressed one-touch or abbreviated dialing key is dialed in step S880. In this original document detection mode, it is usual that a telephone number for facsimile transmission is registered as the first data in a one-touch or abbreviated dialing key while a telephone number for telephone is registered as the second data. However, in this modification, since each telephone number can have attached data representing that the telephone number is for facsimile transmission or telephone, two telephone numbers for telephone communication or for facsimile transmission may be registered in a single one-touch or abbreviated dialing key. Therefore, in this original document detection mode, after the first telephone number is dialed in step S890, it is determined to step S900 whether or not the first telephone number dialed is for telephone communication or for facsimile transmission. If the dialed first telephone number is for facsimile transmission, the process goes to step S680 shown in FIG. 16. If the dialed telephone number is for telephone communication, the telephone mode which used the telephone set 104 is obtained. When the operator depresses the starting key in the operation section 136 in the telephone mode, the facsimile transmission mode is obtained.

If it is determined in step S810 that the facsimile apparatus is in the time and day of the week mode, the same processing as those in steps S600, S620, S640 and S660 shown in FIG. 16 are executed in steps S820, S830, S840 and S850. Thereafter, it is determined in step S860 whether or not the original document is set in the reading circuit 110. If the original document is set, the process goes to step S680 shown in FIG. 16. If the original document is not set, the telephone communication mode is obtained. Even in the time and day of the week mode, the operation mode is automatically switched over between the facsimile transmission mode and the telephone communication mode in accordance with the presence or absence of the original document. When the process goes from either step S830 or step S850 to step S860, determination may be made whether the dialed telephone number is for facsimile transmission or telephone communication. If the dialed telephone number is for telephone number, the telephone communication mode is obtained. If the dialed telephone number is for facsimile transmission, the process goes to step S860.

If the apparatus is in the combination mode, the process goes from step S810 to step S910, and it is determined whether or not the current date and day of the week coincide with the set date and day of the week, as in step S600 shown in FIG. 16. If they coincide with each other, the second telephone number in the depressed one-touch or abbreviated dialing key is read out and dialed is step S960, and the telephone communication mode is obtained. If the current date and day of the week differ from the set date and day of the week, it is determined in step 920 whether or not the current time is between time "a" and time "b", as in step S640 shown in FIG. 16. If the current time is between the set times, the process goes to step S960. If the current time is not between the set times, it is determined in step S930 whether or not original document is set in the reading circuit 110. If the original document is set, the first telephone number in the depressed one-touch or abbreviated dialing key is dialed in step S940. Thereafter, it is determined in step S950 whether or not the dialed telephone number is for telephone communication. If the dialed telephone number is for telephone communication, the telephone communication mode is achieved. If the dialed telephone number is for facsimile transmission, the process goes to step S680.

In this modification, two telephone numbers for telephone communication, two telephone numbers for facsimile transmission, or a telephone number for telephone communication and a telephone number for facsimile transmission can be registered in a single one-touch or abbreviated dialing key. Consequently, each one-touch or abbreviated dialing key can be utilized for different applications which are selected by the operator.

As will be understood from the foregoing description, in the second embodiment, it is possible to call one destination by dialing the telephone number for facsimile transmission (or for telephone conversation) in the office in the daytime and by dialing the telephone number for facsimile transmission (for telephone conversation) in his or her home in the nighttime or on weekends. Consequently, when facsimile transmission (or telephone calling) is made between self-employed people who work in an office located close to their home in the daytime and who come back home in the nighttime, at least one-touch or abbreviated dialing keys can be effectively utilized.

The present invention can also be applied to various telecommunication apparatuses other than facsimile apparatus.

Various changes and modifications may be made in the invention without departing from the spirit and scope of the appended claims.

What is claimed is:

1. A communication apparatus in which at least first and second telephone number data can be registered in a single selection key and in which either of the first and second telephone number data is selected and dialed in accordance with an input of the selection key, comprising:

data communication means for performing data communication;

speech communication means for performing speech communication;

first detection means for detecting a hook state of the speech communication means;

second detecting means for detecting presence or absence of data; and control means for selecting one of the first and second telephone number data in accordance with the detections made by said first and second detecting means in response to the input of the selection key and for dialing the telephone number, wherein the first telephone number data comprises a number for speech communication and the second telephone number data comprises a number for data communication, and wherein said control means selects and dials the second telephone number data when an on-hook state is detected by said first detecting means.

2. The communication apparatus according to claim 1, wherein said control means automatically performs either data communications or data reception conducted in accordance with the detection made by said second detection means after dialing.

3. A communication apparatus having an automatic dialing function, capable of both data communication and speech communication, comprising:

setting means for setting first data representing that a telephone number can be used for speech communication, second data representing that a telephone number for automatic dialing can be used for data communication and third data representing that a telephone number can be used for both speech communication and data communication; and dialing means for performing dialing in accordance with the first, second and third data set by said setting means.

4. The communication apparatus according to claim 3, wherein said dialing means selects the telephone number associated with one of the first data and the third data set by said setting means when automatic dialing is performed for speech communication.

5. The communication apparatus according to claim 3, wherein said dialing means selects the telephone number associated with one of the second and the third data set by said setting means when automatic dialing is performed for data communication.

6. A communication apparatus in which a plurality of telephone numbers can be registered in a single abbreviated dialing key, comprising:

means for setting a time;

means for determining a current time; and means for comparing the current time with the set time, to select one of the plurality of telephone numbers in accordance with the results of the comparison when the abbreviated dialing key is operated, and for dialing the selected telephone number.

7. The communication apparatus according to claim 6, further comprising: means for setting a predetermined date or day of the week; and means for counting a current date or day of the week, wherein the current date and the set date or the current day of the week and the set day of the week are compared with each other, and one of the plurality of telephone numbers is selected and dialed in accordance with the results of the comparison when the abbreviated dialing key is operated.

8. In communication apparatus having data communication and speech communication devices wherein at least first and second telephone number data can be registered by a single selection key and wherein one of the first and second telephone number data is selected in accordance with an input of the selection key, a communication method comprising the steps of:

detecting a hook state of the speech communication device;

detecting presence of data for data communication;

selecting one of the first and second telephone number data in accordance with the detected hook state and the detected presence of data in response to the selection key input; and dialing the selected telephone number, wherein the first telephone number data is a number for speech communication and the second telephone number data is a number for data communication; and wherein the second telephone number is selected when an on-hook state is detected.

9. In apparatus having automatic dialing and capable of data communication and speech communication, a communication method comprising the steps of:

setting telephone number data to one of a first data state representative of a telephone number that can be used for speech communication a second data state representative of a telephone number that can be used for data communication and a third data state representative of a telephone number that can be used for both speech communication and data communication; and performing dialing according to the data state of the telephone number data.

10. In communication apparatus wherein a plurality of telephone numbers can be registered in a single abbreviated dialing key, a communication method comprising the steps of:

setting a time;

determining the current time;

comparing the current time with the set time to select one of the plurality of telephone numbers in accordance with the result of the comparison when the abbreviated dialing key is operated; and dialing the selected telephone number.

* * * * *

UNITED STATES PATENT AND TRADEMARK OFFICE
CERTIFICATE OF CORRECTION

PATENT NO. : 5,239,576
DATED : August 24, 1993
INVENTOR(S) : TAKEHIRO YOSHIDA ET AL.  Page 1 of 3

It is certified that error appears in the above-identified patent and that said Letters Patent is hereby corrected as shown below:

COLUMN 1

Line 32, "is" should read --are--.

COLUMN 2

Line 18, "The" should read --¶ The--.
Line 24, "Other" should read --¶ Other--.

COLUMN 3

Line 20, "layer." should read --later.--.

COLUMN 5

Line 46, "s" should read --a--.

COLUMN 7

Line 62, "is input." (second occurrence) should be deleted.
Line 63, "Address" should read --Address is input.--.

COLUMN 9

Line 31, "registration" should read --Registration--.

UNITED STATES PATENT AND TRADEMARK OFFICE
CERTIFICATE OF CORRECTION

PATENT NO. : 5,239,576
DATED : August 24, 1993
INVENTOR(S) : TAKEHIRO YOSHIDA ET AL.

It is certified that error appears in the above-identified patent and that said Letters Patent is hereby corrected as shown below:

COLUMN 10

Line 4, "reference registration" should read
--Reference Registration--.
Line 10, "invalidated." should read --invalidated. ¶
f) Reference Registration Operation (4)--.

COLUMN 11

Line 60, "is" (second occurrence) should be deleted.

COLUMN 13

Line 23, "33" should be deleted.

COLUMN 15

Line 25, "A112." should read --S112.--.

COLUMN 19

Line 58, "data" should read --date--.
Line 59, "for" (second occurrence) should read
--or for--.

COLUMN 21

Line 16, "original" should read --the original--.

UNITED STATES PATENT AND TRADEMARK OFFICE
CERTIFICATE OF CORRECTION

PATENT NO. : 5,239,576

DATED : August 24, 1993

INVENTOR(S) : TAKEHIRO YOSHIDA ET AL.        Page 3 of 3

It is certified that error appears in the above-identified patent and that said Letters Patent is hereby corrected as shown below:

<u>COLUMN 22</u>

Line 15, "communications" should read --communication--.

<u>COLUMN 23</u>

Line 20, "communication" should read --communication,--.

Signed and Sealed this

Thirty-first Day of May, 1994

Attest:

BRUCE LEHMAN

Attesting Officer    Commissioner of Patents and Trademarks